United States Patent
Mazaki et al.

Patent Number: 5,460,748
Date of Patent: Oct. 24, 1995

[54] LIQUID CRYSTALLINE POLYMER FILM, PROCESS FOR PRODUCING SAME, AND UTILIZATION THEREOF

[75] Inventors: Hitoshi Mazaki, Kawasaki; Takuya Matsumoto, Yokohama; Iwane Shiozaki, Yokohama; Shigeki Takikawa, Yokohama, all of Japan

[73] Assignee: Nippon Oil Company, Limited, Tokyo, Japan

[21] Appl. No.: 252,922

[22] Filed: Jun. 2, 1994

[30] Foreign Application Priority Data

| Jun. 2, 1993 | [JP] | Japan | 5-168298 |
| Jun. 30, 1993 | [JP] | Japan | 5-209844 |
| Aug. 30, 1993 | [JP] | Japan | 5-248417 |
| Nov. 17, 1993 | [JP] | Japan | 5-323048 |

[51] Int. Cl.$^6$ .............. C09K 19/52; G02F 1/13
[52] U.S. Cl. .............. 252/299.01; 359/73
[58] Field of Search .............. 252/299.01; 359/73

[56] References Cited

U.S. PATENT DOCUMENTS

| 5,073,294 | 12/1991 | Shannon et al. | 252/299.01 |
| 5,206,109 | 11/1993 | Iida et al. | 428/1 |
| 5,214,523 | 5/1993 | Nito et al. | 359/100 |
| 5,241,408 | 8/1993 | Ishewaka et al. | 359/53 |
| 5,250,214 | 10/1993 | Kanemoto et al. | 252/299.01 |
| 5,301,049 | 4/1994 | Katagiri et al. | 359/90 |
| 5,316,693 | 5/1994 | Yuasa et al. | 252/299.01 |
| 5,326,496 | 7/1994 | Iida et al. | 252/299.01 |
| 5,347,378 | 9/1994 | Handschy et al. | 359/53 |
| 5,354,489 | 10/1994 | Inoue et al. | 252/73 |
| 5,359,443 | 10/1994 | Toyooka et al. | 359/76 |

*Primary Examiner*—Gary L. Geist
*Assistant Examiner*—C. Harris
*Attorney, Agent, or Firm*—Scully, Scott, Murphy & Presser

[57] ABSTRACT

A liquid crystalline polymer film useful as a high functional optical element is provided. Said liquid crystalline polymer film is formed on a substrate and having at least a tilt orientation fixed, and said tilt orientation is such that the angle between a director of said liquid crystalline polymer and a flat surface of said substrate is in the range of 5 to 85 degrees in terms of an average value.

4 Claims, 5 Drawing Sheets

LIQUID CRYSTALLINE POLYMER FILM, PROCESS FOR PRODUCING SAME, AND UTILIZATION THEREOF

BACKGROUND OF THE INVENTION

The present invention relates to a liquid crystalline polymer film useful as a high function optical element, a process for producing the same, and utilization thereof.

A polymer film having birefringence property is anisotropic in refractive index and functions as an optical element which controls the state of polarization. It has various industrial uses, including a phase contrast film for improving the image quality of a liquid crystal display, a half-wave plate and a quarter-wave plate.

Most of the conventional polymer films having birefringence property have been obtained by stretching films such as polycarbonate films for example. However, a limit has been encountered in improving their performance because the means for controlling their physical properties such as refractive index and birefringence is only the stretching operation which is substantially a processing technique. Particularly, as to controlling a three-dimensional refractive index structure for which there has been an increasing demand recently, a limit is encountered.

On the other hand, an optical material using a iquid crystalline polymer possesses great characteristics; for example, they have a greater birefringence property than that of stretched films, and it is possible to freely control its optical properties such as refractive index or birefringence because the orientation behavior of the liquid crystalline polymer is rich in variety. Particularly, a liquid crystalline polymer which exhibits twisted nematic orientation is a more useful material which possesses a novel ability of rotating the direction of polarization of light because it is possible to effect a molecular twisted orientation which cannot be obtained by a stretched polymer film, and thus the said liquid crystalline polymer is a very useful material.

When such a liquid crystalline polymer is oriented on a substrate, and in the case of a liquid crystal which exhibits a nematic orientation property, there is obtained a homogeneous orientation wherein the orienting direction (hereinafter referred to as the "director") of liquid crystalline molecules is approximately parallel to the substrate or a homeotropic orientation wherein the director is approximately perpendicular to the substrate. Further, in the case of a liquid crystal which exhibits a chiral nematic orientation property, there is obtained an orientation having a spiral structure while making a homogeneous orientation. Besides, the control of refractive indices distribution and that of the spiral structure can be done easily by controlling the structure of the liquid crystal molecules. By these structural controls it is made possible to develop various optical properties.

Thus, the liquid crystalline polymer possesses excellent features not found in other polymers in point of variety of structure and the capability of freely controlling optical properties which is based on such structural variety. But even the liquid crystalline polymer is not almighty, but there is a limit. More particularly, in any orientation behavior, the director of liquid crystal orientation can only exhibit either orientation nearly parallel to a substrate or orientation nearly perpendicular to the substrate. Heretofore, there has been no example of having realized a so-called tilt orientation with liquid crystal molecules tilted from a plane of a substrate.

The present inventors hit upon the idea that if there could be realized a twisted tilt orientation at a certain angle, not 0°, between the director of liquid crystal molecules and the plane of a substrate, the capability of freely controlling refractive indices, especially refractive indices in three-dimensional directions, would be enhanced even in comparison with an optical material using a stretched polymer film or a liquid crystalline polymer film obtained by fixing the orientation of an ordinary liquid crystalline polymer exhibiting a twisted nematic orientation. Having made subsequent earnest studies for the purpose of improving the performance or developing a novel feature of an optical material using a liquid crystalline polymer film, the present inventors at last accomplished the present invention.

Accordingly, it is the object of the present invention to provide a liquid crystalline polymer film having a novel feature such as the capability of freely controlling refractive indices in three-dimensional directions, as well as a process for producing the same and the use thereof.

SUMMARY OF THE INVENTION (1) According to the present invention there is provided a liquid crystalline polymer film formed on a substrate and with at least a tilt orientation fixed, the said tilt orientation being such that a mean value of angles between the director of the liquid crystalline polymer and a plane of the subtrate is in the range of 5° to 85°.

(2) According to the present invention there is provided a liquid crystalline polymer film formed on a substrate and having a fixed twisted tilt orientation, the said twisted tilt orientation being such that a mean value of angles between the director of the liquid crystalline polymer and a of the substrate is in the range of 5° to 85°, and a projection of the director of the liquid crystalline polymer on the plane of the substrate being rotated continuously in the thickness direction of the film.

(3) According to the present invention there is provided a process for producing a liquid crystalline polymer film, comprising orienting on a substrate a liquid crystalline polymer which assumes a glassy state at a temperature lower than its liquid crystal transition point, at a temperature exceeding the said liquid crystal transition point and in tilted state such that crystalline polymer a mean value of angles between the director of the liquid crystalline polymer and the substrate surface is tilted at an angle of 5° to 85°, at 5° to 85°, and subsequent cooling to a temperature lower than the liquid crystal transition point to fix the tilted state with respect to the substrate surface.

(4) According to the present invention there is provided a process for producing a liquid crystalline polymer film, comprising orienting a liquid crystalline polymer on a substrate at a temperature exceeding the liquid transition point of the polymer and in a twisted, tilted state such that a mean value of angles between the director of the liquid crystalline polymer and a plane of a substrate is in the range of 5° to 85° and a projection of the director of the liquid crystalline polymer on the plane of the substrate is rotated continuously in the film thickness direction, and subsequent cooling to a temperature lower than the liquid crystal transition point to fix the twisted, tilted state.

(5) According to the present invention there is provided a compensator for a liquid crystal display, substantially comprising a light transmitting substrate and a liquid crystalline polymer layer formed on the substrate and having a fixed tilt orientation and a fixed twisted orientation or a fixed twisted tilt orientation, the said twisted tilt orientation being such that a mean value of angles between the director of the liquid crystalline polymer and a flat surface of the substrate is in the range of 5° to 85° and a projected portion of the director of the liquid crystalline polymer to the flat surface of the substrate is rotated continuously in the film thickness direction.

(6) According to the present invention there is provided a viewing angle compensating method for a liquid crystal display using a liquid crystalline polymer film formed on a substrate and having a fixed tilt orientation or a fixed twisted tilt orientation, the said twisted tilt orientation being such that a mean value of angles between the director of the liquid crystalline polymer and a plane of the substrate is in the range of 5° to 85° and a projection of the director of the liquid crystalline polymer on the substrate plane is rotated continuously in the film thickness direction.

(7) According to the present invention there is provided a liquid crystalline polymer film formed by a liquid crystalline polymer composition comprising at least a liquid crystalline polymer which exhibits a homeotropic orientation property and a liquid crystalline polymer which exhibits a homogeneous orientation property.

BRIEF DESCRIPTION OF THE DRAWINGS

The present invention will be better understood with reference to the accompanying drawings of which.

DETAILED DESCRIPTION OF THE INVENTION

Figure 1:
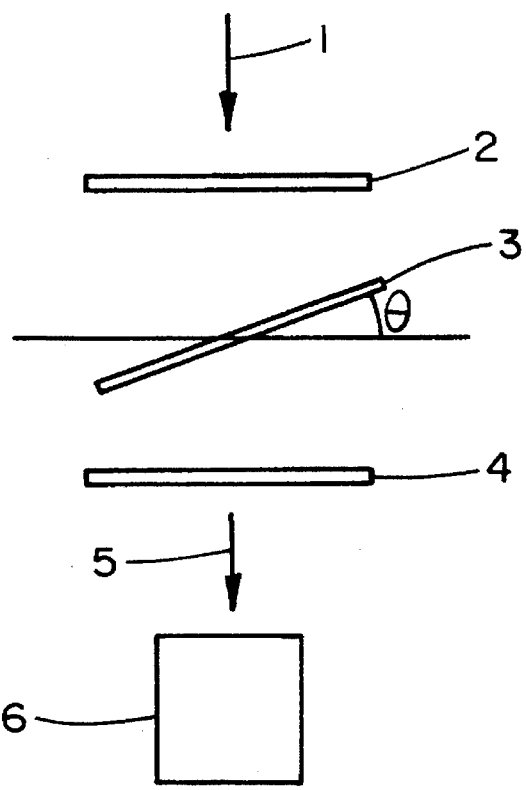
FIG. 1 is an explanative view showing an optical measurement system used in the examples.

The present invention will be described in detail hereinunder.

The director of a liquid crystalline polymer as referred to herein is a term used widely in the liquid crystal field and it is a vector indicating an average orientation direction of liquid crystal molecules in a certain microscopic region.

Next, the twisted tilt orientation as referred to herein will now be explained. First, as to the tilt orientation, if a mean value of angles between the director of a liquid crystalline polymer and a projection of the director on a plane of a substrate is defined to be a tilt angle, the tilt orientation represents such an orientation as the said tilt angle is neither 0° nor 90°.

The tilt angle of the tilt orientation of a liquid crystalline polymer used in the present invention is in the range of 5° to 85°, preferably 8° to 80°, more preferably 10° to 70°. If the tilt angle is smaller than 5° or larger than 85°, such tilt orientations will be substantially the same as homogeneous orientation and homeotropic orientation, respectively, so it becomes impossible to freely control desired three-dimensional optical characteristics.

There are several kinds of tilt orientations. According to a typical example of a tilt orientation, the director of liquid crystal molecules in a liquid crystal lyaer is almost constant at any position in the film thickness direction. There also are included a tilt orientation wherein in the vicinity of the substrate interface the director is generally parallel to a flat surface of the substrate, indicating an orientation similar to a homogeneous orientation and as the interface on the side opposite to the substrate is approached, the director rises gradually, exhibiting a homeotropic orientation or an oriented state close thereto, and a tilt orientation corresponding to the case reverse to the above, that is, the case where in the vicinity of the substrate interface there is observed a homeotropic orientation or an orientation similar thereto and as the interface on the side opposite to the substrate is approached, there is observed a gradual approach to a homogeneous orientation. Both a tilt orientation wherein the angle between the director and a projection of the director to a plane of a substrate is constant at any point in the film thickness direction, and a tilt orientation wherein the said angle changes continuously in the film thickness direction, are included in the scope of the tilt orientation as referred to herein. In the latter case, a mean value of such angles changing continuously in the film thickness direction corresponds to the tilt angle defined in the invention.

Description is now directed to the twisted tilt orientation. The twisted tilt orientation means the above-mentioned tilt orientation plus twist. More specifically, the twisted tilt orientation indicates a state of orientation wherein a liquid crystalline polymer is oriented in a tilted state and a projection of its director on a plane of a substrate is rotated continuously in the film thickness direction. In this case, a suitable twist angle may be selected arbitrarily, but usually from the range of 10° to 3600°, preferably from the range of 20° to 3000°.

One of liquid crystalline polymers employable in the present invention is in the form of a liquid crystalline composition containing as essential components both a liquid crystalline polymer having a homeotropic orientation property and a liquid crystalline polymer having a homogeneous orientation property.

When the said liquid crystalline polymer composition is oriented on a substrate, there can be realized a tilted orientation which is neither the conventional homeotropic orientation nor homogeneous orientation but is an intermediate orientation between the two. More particularly, it is possible to make orientation in such a manner that the major axes of the constituent polymer molecules extend in a direction different from the substrate surface and also different from a substrate normal line direction. Further, by either introducing an optically active unit into the polymers or by making an optically active substance present in the composition, it is possible to realize a structure having both tilt orientation and twisted structure (spiral structure).

Reference will now be made to characteristic features of both the liquid crystalline polymer having a homeotropic orientation property and the liquid crystalline polymer having a homogeneous orientation property. The homeotropic orientation indicates a state of orientation wherein the director of the polymer is approximately perpendicular to a plane of a substrate, while the homogeneous orientation indicates a state of orientation wherein the polymer director is approximately parallel to the substrate plane.

As to what orientation property each polymer possesses, this can be determined according to which of homeotropic orientation and homogeneous orientation the liquid crystalline polymer exhibits in the state of liquid crystal upon formation of a layer thereof. No limitation is placed on the substrate employable in the said judgment. But as examples there are mentioned glass substrates such as substrates formed of soda glass, potash glass, borosilicate glass, or optical glass, e.g. crown glass or flint glass, as well as plastic films or sheets which are resistant to heat at the liquid crystallization temperature of each liquid crystalline polymer, such as films or sheets of polyethylene terephthalate, polyethylene naphthalate, polyphenylene oxide, polyimide, polyamide-imide, polyether-imide, polyamide, polyether ketone, polyether ether ketone, polyketone sulfide and polyether sulfone. These substrates are used after cleaning their surfaces with, for example, acids, alcohols or detergents, provided surface treatment such as treatment with silicon is not performed. A polymer which exhibits a homeotropic orientation on at least any one of the substrates exemplified above is here defined as a polymer having a homeotropic orientation property. On the other hand, a polymer which exhibits a homogeneous orientation for any of those substrates, namely, a polymer which has been judged not to have a homeotropic orientation property is here defined as a polymer having a homogeneous orientation property, provided since some such polymers exhibit a homeotropic orientation property specifically at a temperature near the liquid crystal phase—isotropic phase transition point, the heat treatment operation is conducted usually at a temperature lower by 15° C. or more, preferably by 20° C. or more, than the liquid crystal phase—isotropic phase transition temperature.

The following description is now provided about the structure of each polymer. First, features common to both the polymer having a homeotropic orientation property and the polymer having a homogeneous orientation property will be described. The kind of liquid crystalline polymers to be used is not specially limited. As examples, mention may be made of main chain type liquid crystalline polymers such as polyesters, polyamides, polycarbonates and polyester-imides, as well as side chain type liquid crystalline polymers such as polyacrylates, polymethacrylates, polymalonates and polysiloxanes. Above all, polyesters are preferred from the standpoint of easiness of preparation, orientation property and glass transition point. Constituent units of such polyesters are not specially limited, but as preferred examples there are mentioned (a) unit derived from any of dicarboxylic acids (hereinafter referred to as dicarboxylic acid unit"), (b) unit derived from any of diols ("diol unit" hereinafter) and (c) unit derived from any of hydroxycarboxylic acids each having both carboxyl group and hydroxyl group in one unit "hydroxycarboxylic acid unit" hereinafter). A unit derived from a compound having an asymmetric carbon (an optically active compound) is also employable as a constituent unit. Most of polymers containing an optically active unit exhibit a chiral nematic phase (twisted nematic phase or cholesteric phase) as a liquid crystal phase. On the other hand, polymers not containing an optically active unit exhibit a nematic phase as a liquid crystal phase. The polyesters may be any of (a)+(b) type, (a)+(b)+(c) type and (c) alone.

Examples of the dicarboxylic acid unit (a) include

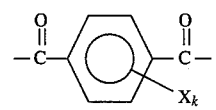

wherein X represents hydrogen, halogen, e.g. Cl or Br, an alkyl group, e.g. methyl, ethyl, propyl, isopropyl, butyl or t-butyl, an alkoxy group, e.g. methoxy, ethoxy, propoxy or buthoxy, or phenyl group, and k is 0 to 2,

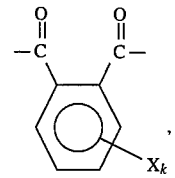

,

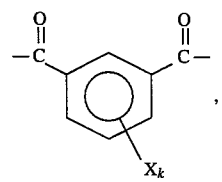

,

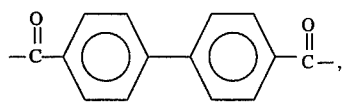

,

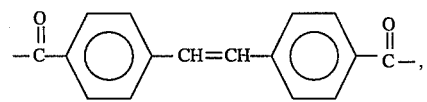

,

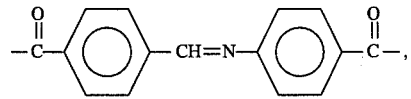

,

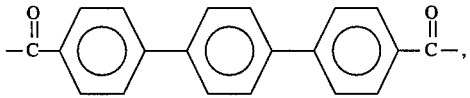

,

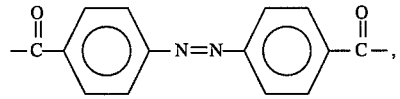

,

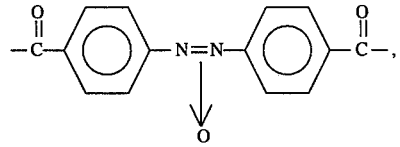

-continued
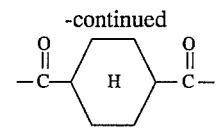
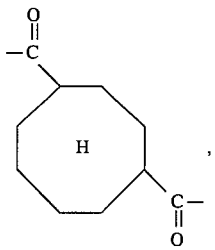
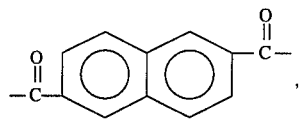
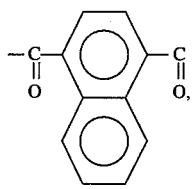
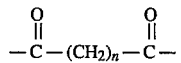
(n is an integer of 2-12),
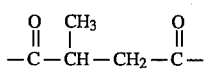
(* represents an optically active carbon)
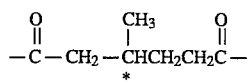
and the like.
Examples of the diol unit (b) include the following:
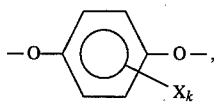
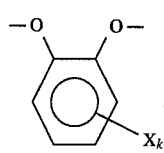
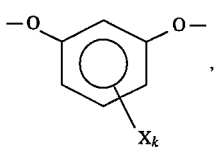
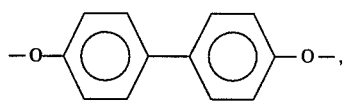
-continued
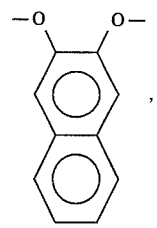
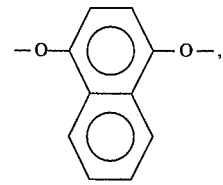
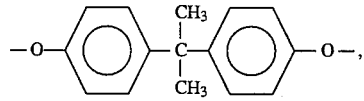
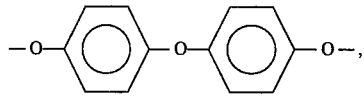
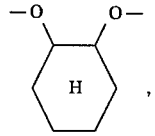
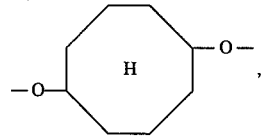
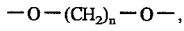
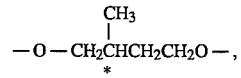
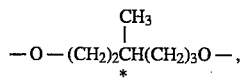
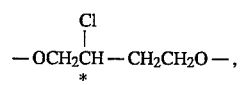

-continued

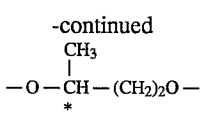

and the like.

Examples of the hydroxycarbonylic acid, unit (c) include the following:

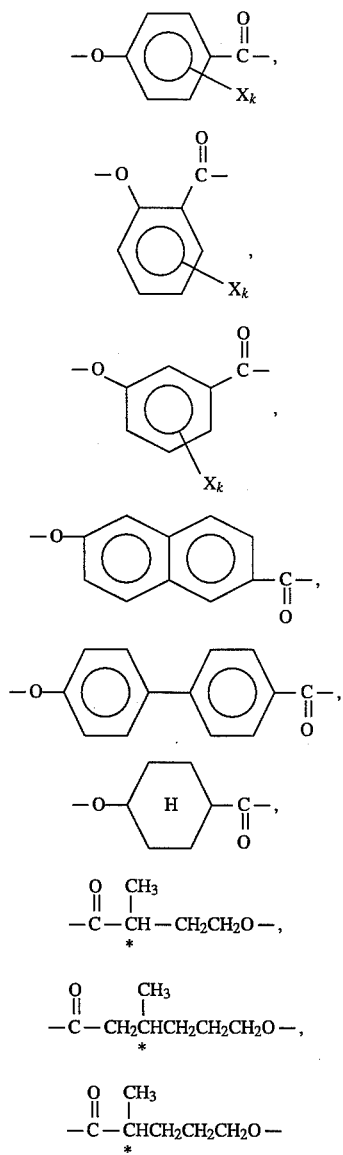

and the like.

Reference will be made below to typical examples of the polymer having a homeotropic orientation property and of the polymer having a homogeneous orientation property.

Both polymers are distinguished from each other by the foregoing judging method. As typical examples of the polymer having a homeotropic orientation property there are mentioned polyesters containing an aromatic unit having an alkyl group of 3 or more, preferably 3 to 12, carbon atoms as a substituent group or as part thereof and as a substituted or additional unit in part of the foregoing constituent units, as well as polyesters which contain an aromatic unit having flouorine or a fluorine-containing group as a substituent group or as part thereof and as such constituent unit.

-continued

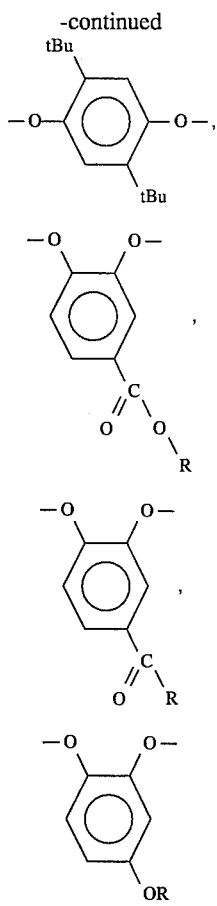

(R is an alkyl having 3 to 12 carbon atoms) and the like.

Examples of the aromatic unit having fluorine or fluorine-containing substituent include the following:

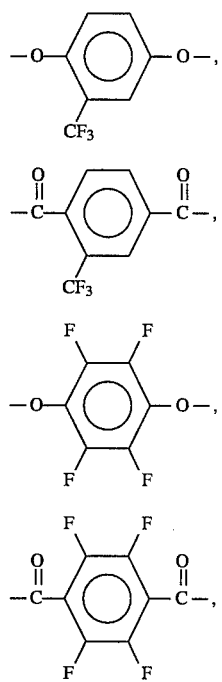

-continued

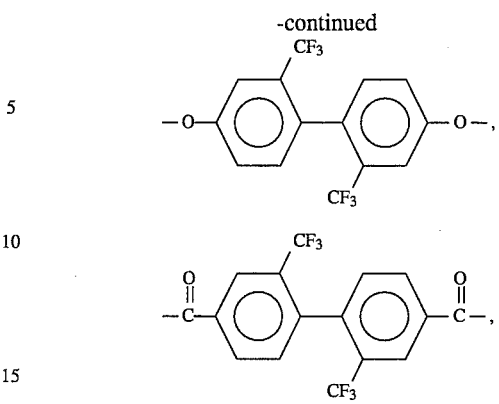

and the like.

For fixing the orientation of the liquid crystalline polymer composition in the invention, it is desirable to use polymers which assume a glassy state without crystallization in a lower temperature portion than the liquid crystal phase. In the case of fixing the liquid crystal structure of the composition, the polymer molecules are once oriented at the liquid crystal temperature, followed by cooling for the fixing. However, in the case where a composition having a crystal phase is used, there is a fear that the state of orientation once obtained will be destroyed. For example, in the case of the polyesters exemplified above, an ortho-substituted aromatic unit is preferred as a constituent unit for preventing crystallization. The "ortho-substituted aromatic unit" means a structural unit wherein main chain-constituting bonds are ortho to each other. In order for the composition to assume a glassy state without crystallization in a lower temperature portion than the liquid crystal phase, it is preferred that at least one of the polymer having a homeotropic orientation property and the polymer having a homogeneous orientation property both constituting the composition contain such structural unit.

Examples of the ortho-substituted aromatic unit include the following catechol, salicylic acid and phthalic acid units as well as substituted derivatives thereof:

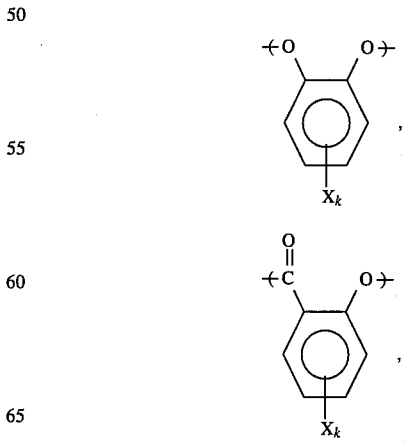

-continued
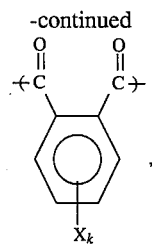
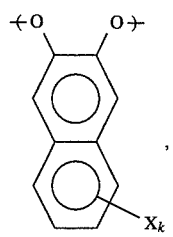
The following are particularly preferred:
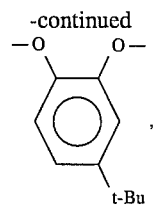,
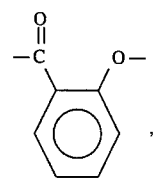,
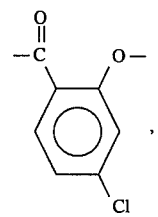,
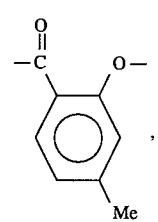,
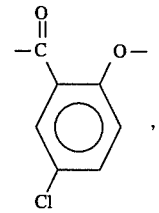,
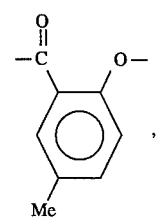,
-continued
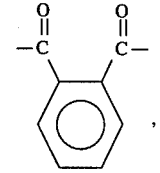,
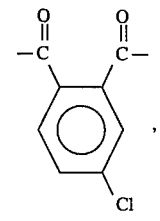

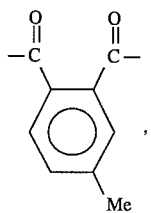

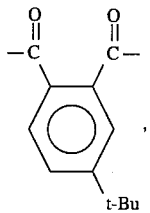

Me: methyl
Et: ethyl
Bu: butyl

In the polymer having a homeotropic orientation property and the polymer having a homogeneous orientation propety constituting the liquid crystalline composition of the present invention, the following polymers are exemplified as preferable polyesters:

Examples of the polymer having a homeotropic orientation property are as follows:

Polymer consisting essentially of the following structural unit:

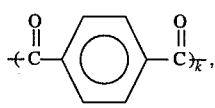

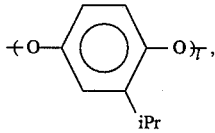

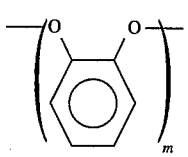

(wherein k, l and m represent merely composition ratio (mol), and k=l+m, l/m=100/0-20/80, preferably 95/5-30/70)

Polymer consisting essentially of the following structural units:

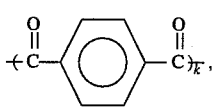

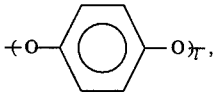

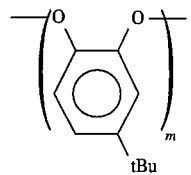

(k=l+m, l/m =98/2-20/80, preferably 95/5-30/70)

Polymer consisting essentially of the following structural units:

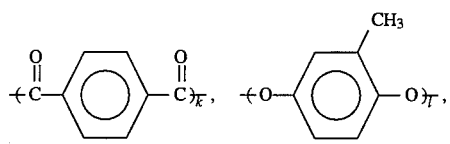

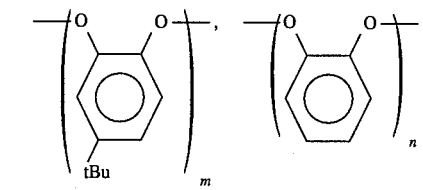

(k=l+m+n, l/m=98/2-20/80, preferably preferably 95/5-30/70), 1/n=98/2-20/80, preferably 95/5-30/70)

Polymer consisting essentially of the following structural units:

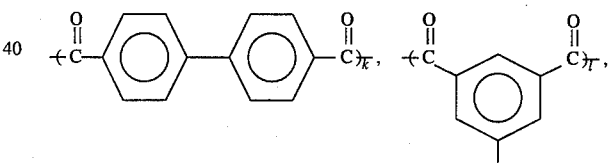

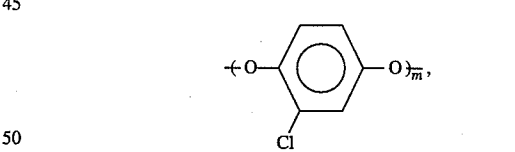

(k+l=m, k/l-98/2-20/80, preferably 95/5-30/70)

Polymer consisting essentially of the following structural units:

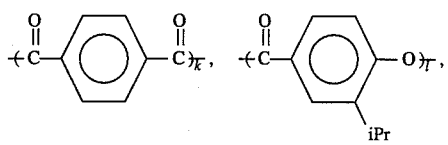

(k/l=98/2-20/80, preferably 95/5-30/70, l/m=98/2-20/80, preferably 95/5-30/70, n=an integer of 2–12)

Polymer consisting essentially of the following structural units:

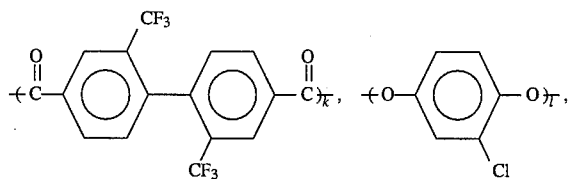

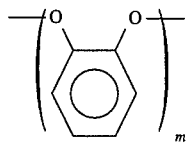

(k=l+m, l/m=98/2-20/80, preferably 95/5-30/70)

Polymer consisting essentially of the following structural units:

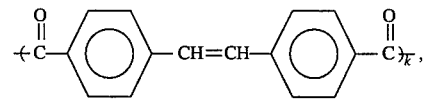

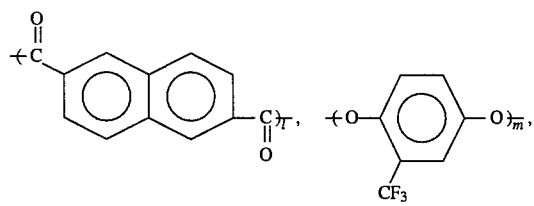

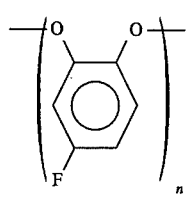

(k+l=m+n, k/l=100/0-0/100, preferably 95/5-5/95, m/n=98/2-20/80, preferably 95/5-30/70)

Polymer consisting essentially of the following structural units:

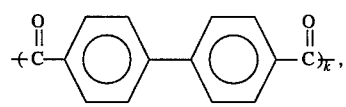

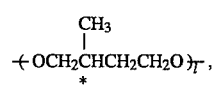

K=l+m, l/m=100/0-0/100, preferably 98/2-2/98, n=an integer of 2–12)

In the above formulae, the composition ratio of respective structural units such as k, l and m means molar ratio only, and does not means block unit.

Examples of the polymer having homogeneous orientation property are as follows.

Polymer consisting essentially of the following structural units:

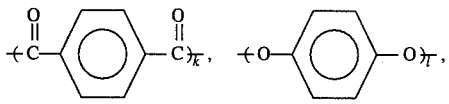

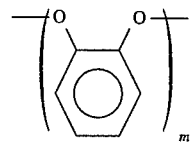

(k=l+m, l/m=80/20-20/80, preferably 75/25-25/75)

Polymer consisting essentially of the following structural units:

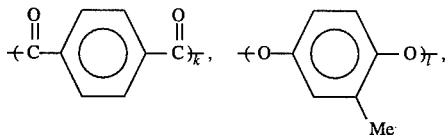

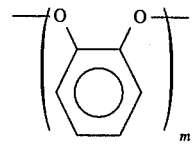

(k=l+m, l/m=80/20-20/80, preferably 75/25-25/75)

Polymer consisting essentially of the following structural units:

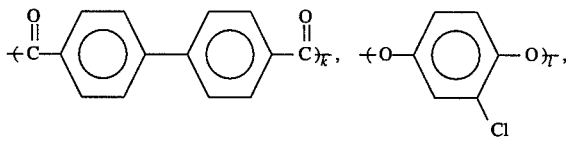

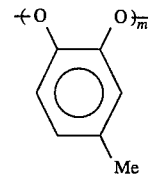

(k=l+m, l/m=80/20-20/80, preferably 75/25-25/75)

Polymer consisting essentially of the following structural units:

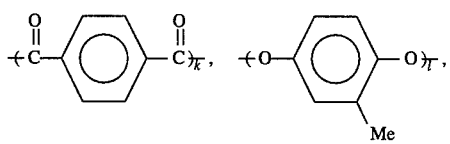

-continued

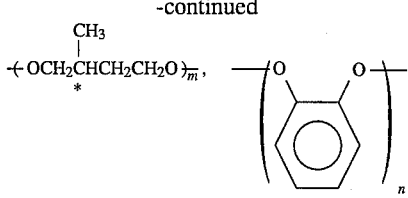

(k=1+m+n, 1/m=80/20-20/80, preferably 75/25-25/75, 1/n=80/20-20/80, preferably 75/25-25/75)

Polymer consisting essentially of the following structural units:

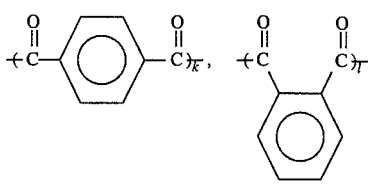

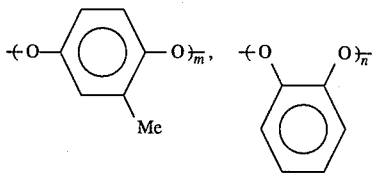

(k+1=m+n, k/1=80/20-20/80, preferably 75/25-25/75, m/n=80/20-20/80, preferably 75/25-25/75)

Polymer consisting essentially of the following structural units:

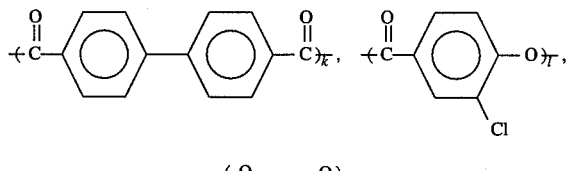

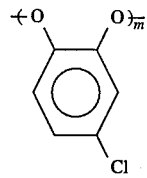

(k=1+m, 1/m=80/20-20/80, preferably 75/25-25/75)

Polymer consisting essentially of the following structural units:

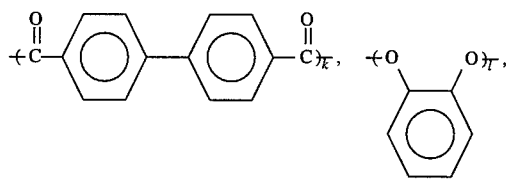

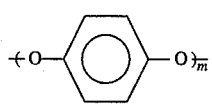

(k/1=80/20-20/80, preferably 75/25-25/75, 1/m=80/20-20/80, preferably 75/25-25/75)

Polymer consisting essentially of the following structural units:

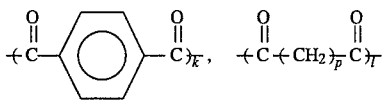

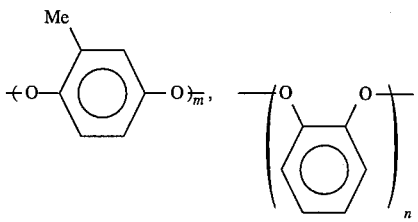

(K+1=m+n, Kl/1=80/20-20/80, preferably 75/25-25/75, m/n=80/20-20/80, preferably 75/25-25/75, p=2–12)

Polymer consisting essentially of the following structural units:

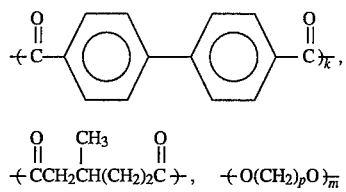

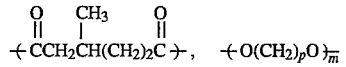

(k+1=m, k/1=80/20-20/80, preferably 75/25-25/75, p=2–12)

The polymers exemplified above range in molecular weight preferably from 0.05 to 3.0, more preferably 0.07 to 2.0, in terms of inherent viscosity as determined at 30° C. in a solvent, e.g. a 60/40 weight ratio phenol/tetrachlorethane solvent. An inherent viscosity lower than 0.05 is not desirable because the strength of the resulting film of polymer liquid crystal will be low, while if the inherent viscosity is higher than 3.0, there will arise such problems as the deterioration of orientatability and an increase of the time required for orientation because of too high viscosity.

How to prepare the polymer used in the present invention is not specially limited. There may be adopted any of the polymerization processes known in this field, e.g. a melt polymerization process or an acid chloride process using an acid chloride of a corresponding dicarboxylic acid.

According to a melt polycondensation process, the polyester can be prepared by polymerizing a corresponding dicarboxylic acid and an acetylated compound of a corresponding diol at a high temperature. The molecular weight thereof can be adjusted easily by controlling the polymerization time or the feed composition. For accelerating the polymerization reaction there may be used a known metal salt such as sodium acetate. In the case of using a solution polymerization process, the polyester can be prepared easily by dissolving predetermined amounts of a dicarboxylic acid dicholoride and a diol in a solvent and heating the resulting solution in the presence of an acid acceptor such as pyridine.

As mentioned above, it is a great characteristic of the liquid crystalline polymer composition that it contains at least both polymer having a homeotropic orientation property and polymer having a homogeneous orientation property. Further, an optically active substance may be added to the composition for imparting twist to the orientation structure of the composition. As noted previously, also in the case where an optically active unit is contained in the skeleton of the polymer having a homeotropic orientation property and/or that of the polymer having a homogeneous orientation property, the composition assumes the ordinary chiral nematic phase as a liquid crystal phase.

As such optically active substances used as additives there may be used both low molecular and high molecular compounds if only they are optically active. However, optically active, liquid crystalline compounds are preferred from the standpoint of compatibility with the liquid crystalline polymers as base polymers. As examples, mention may be made of the following:

active high-molecular compounds. Any polymer may be used if only it contains an optically active group in the molecule, but when the compatibility with the base polymer is taken into account, it is desirable to use a polymer which exhibits liquid crystallinity. Examples are the following liquid crystalline polymers having optical activity: polyacrylates, polymethacrylates, polymalonates, polysiloloxanes, polyesters, polyamides, polyester amides, polycarbonates, polypeptides, and cellulose. Above all, from the standpoint of compatibility with the liquid crystalline polymer serving as the base, mainly aromatic, optically active polyesters are most preferred. Examples are the following polymers:

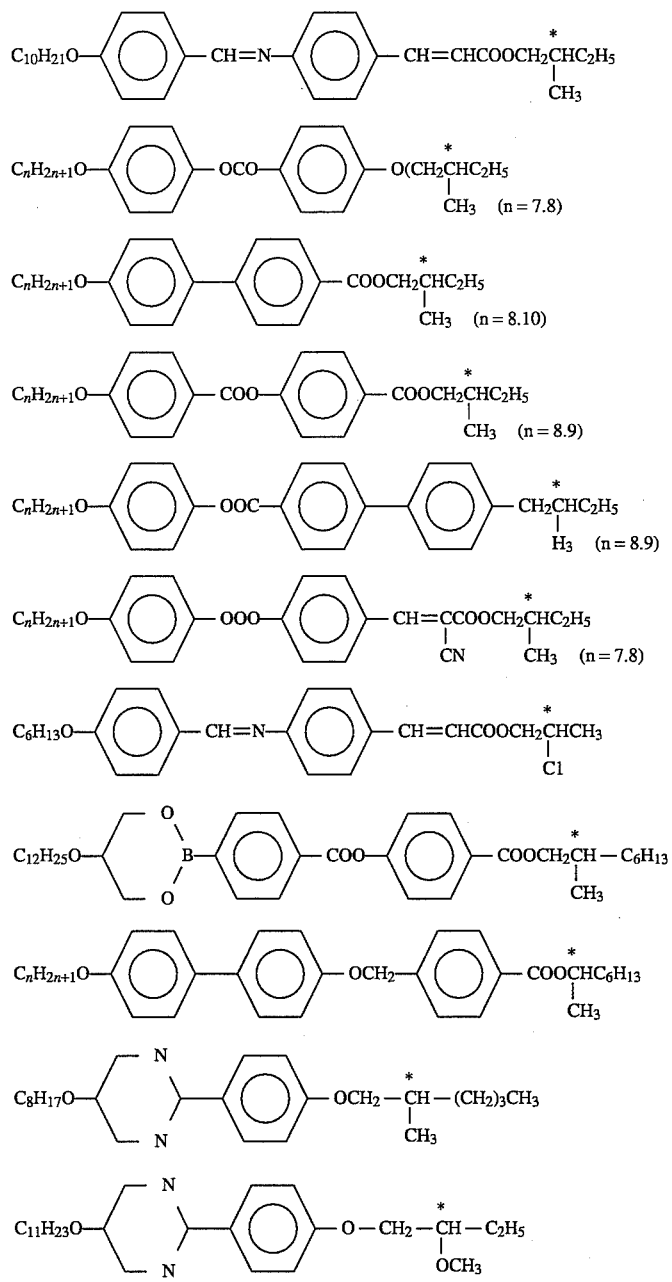

cholesterol derivatives and the like.

As examples of the optically active compound used in the present invention there also may be mentioned optically Polymers comprising the following structural units:

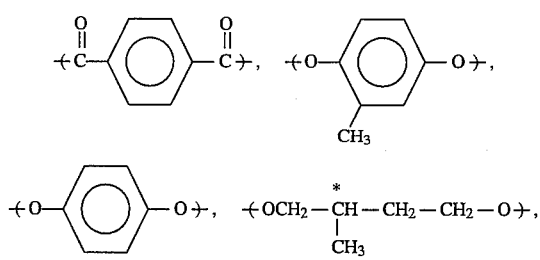

Polymer consisting essentially of the following structural units:

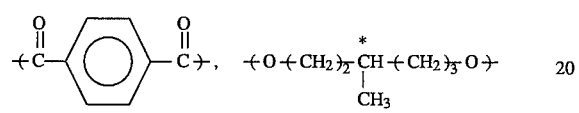

Polymer consisting essentially of the following structural units:

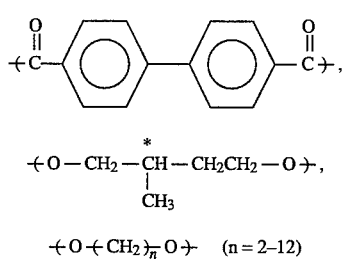

Polymer consisting essentially of the following structural units:

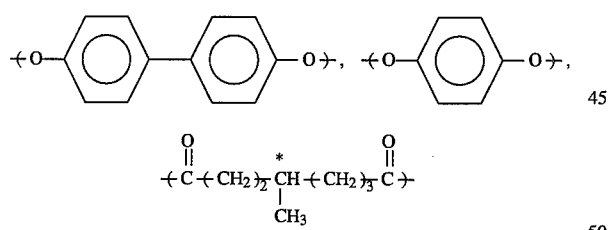

Polymer consisting essentially of the following structural units:

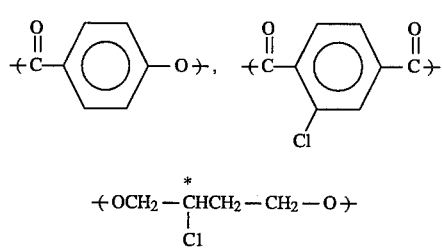

Polymer consisting essentially of the following structural units:

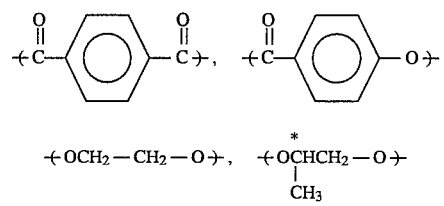

Polymer consisting essentially of the following structural units:

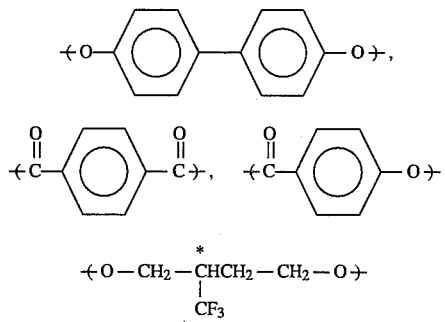

Polymer consisting essentially of the following structural units:

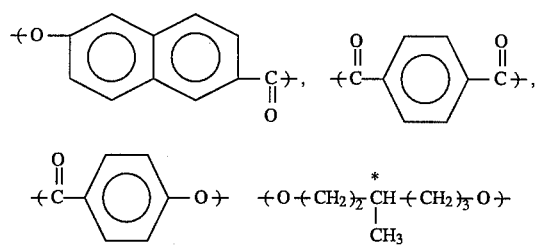

Polymer consisting essentially of the following structural units:

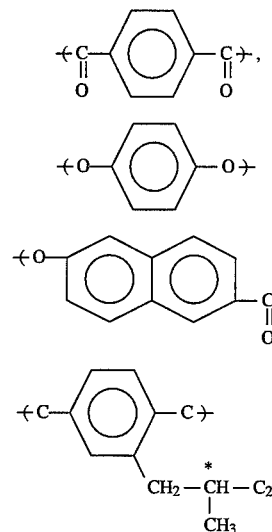

Polymer consisting essentially of the following structural units:

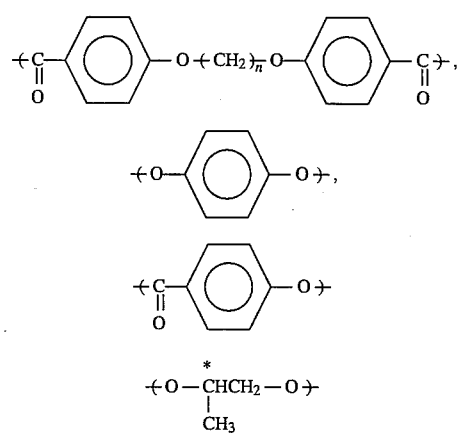

Polymer consisting essentially of the following structural units:

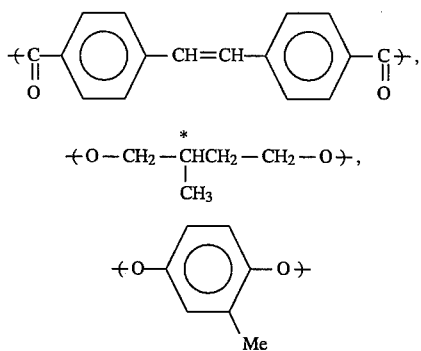

In each of these polymers, the proportion of the unit having an optically active group is usually in the range of 0.5 to 80 mole %, preferably 5 to 60 mole %.

These polymers preferably range in molecular weight from 0.05 to 5.0 in terms of inherent viscosity as determined at 30° C. in phenol/tetrachloroethane for example. An inherent viscosity larger than 5.0 is not desirable because of too high viscosity which eventually causes deterioration of orientatability. An inherent viscosity smaller than 0.05 is not desirable, either, because it becomes difficult to control the composition.

The composition in question can be obtained by mixing, in a solid, solution or melted state, both polymer having a homeotropic orientation property and polymer having a homogeneous orientation property, which are essential components, or both such essential components plus an optional component, e.g. an optically active compound. No special limitation is placed on conditions for this operation. Suitable known conditions may be adopted.

As to the mixing ratio of the polymer having a homeotropic orientation property to the polymer having a homogeneous orientation property, it cannot be said sweepingly because it differs according to polymers used or purposes, but is usually in the range from 99:1 to 0.5: 99.5, preferably 98:2 to 1:99, more preferably 95:5 to 2:98, in terms of weight ratio. If the proportion of the former polymer is less than 0.5 wt %, the properties of the resulting composition will be almost the same as those of the composition obtained by using the latter polymer alone and sometimes it is impossible to obtain a desired novel orientation structure. Also in the case where the proportion of the latter polymer, i.e., the polymer having a homogeneous orientation property, is less than 1 wt %, the properties of the resulting composition will sometimes be about the same as those of the composition obtained by using the former polymer, i.e., the polymer having a homeotropic orientation property, alone.

In the case of adding an optically active substance to the composition, the proportion thereof in the composition is usually not more than 50 wt %, preferably not more than 40 wt %, more preferably in the range of 0.1 to 35 wt %.

The following description is now provided about other employable liquid crystalline polymers in the invention than those referred to above.

The liquid crystalline polymer(s) used in the invention possesses a nematic or twisted nematic phase as a liquid crystal phase. More specifically, it has an orientation structure such that the liquid crystal molecules thereof are each oriented at a certain angle relative to a plane of a substrate, but a projection component thereof faces a certain constant direction at all times.

Any liquid crystalline polymer is employable in the invention if only it assumes a tilt orientation or a twisted tilt orientation at a temperature higher than its liquid crystal transition point and can be fixed in a glassy state (glass fixing ability) without impairing its structure. The following are examples of liquid crystalline polymers having such properties:

① Liquid crystalline polymers having the tilt orientation ability and the glass fixing ability;

② Composition comprising a liquid crystalline polymer having the tilt orientation ability and the glass fixing ability and a liquid crystalline polymer having the glass fixing ability;

③ Composition comprising a liquid crystalline polymer having the tilt orientation ability and the glass fixing ability and another liquid crystalline polymer; and ④ Composition comprising a liquid crystalline polymer having the tilt orientation ability and a liquid crystalline polymer having the glass fixing ability.

In order to obtain a twisted tilt orientation, it is necessary to further impart optical activity to the above polymers or compositions. One method is to introduce an optically active unit into the polymers mentioned in the above ① to ④. Another method is to use a composition comprising each of the above ① to ④ and an additional, low or high molecular, optically active compound.

As examples of liquid crysttalline polymers having the tilt orientation property as base polymers there are mentioned main chain type liquid crystalline polymers such as polyesters, polyamides, polycarbonates and polyester-imides, as well as side chain type liquid crystalline polymers such as polyacrylates, polymethacrylates, polymalonates and polysiloxanes. Particularly, polyesters are preferred from the standpoint of easiness of preparation, orientability and glass transition point.

As examples of liquid crystalline polyesters having the tilt orientation ability there are mentioned polyesters containing as a constituent an aromatic unit having an alkyl group of 3 or more carbon atoms in the main chain, a unit having an alkyl skeleton of 3 or more carbon atoms, or an aromatic unit having fluorine or a fluorine-containing substituent group. The following are examples of such structural units:

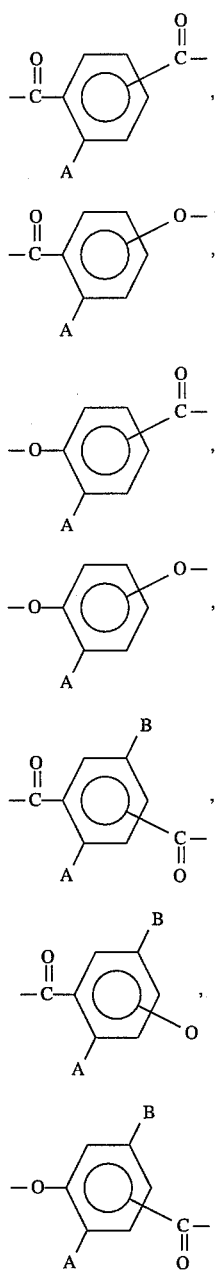
wherein A and B are each a linear or branched alkyl, —OR, —COOR, —OCOR, —O(CH₂CH₂O)ₙR', —COO(CH₂CH₂O)ₙR, —OCO(CH₂CH₂O)ₙR',
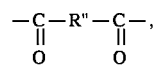
—O—R"—O— or
—O— (R is a linear or branched alkyl having 3 to 12 carbon atoms, R' is methyl or ethyl, R" is a linear or branched alkyl having 3 to 12 carbon atoms)
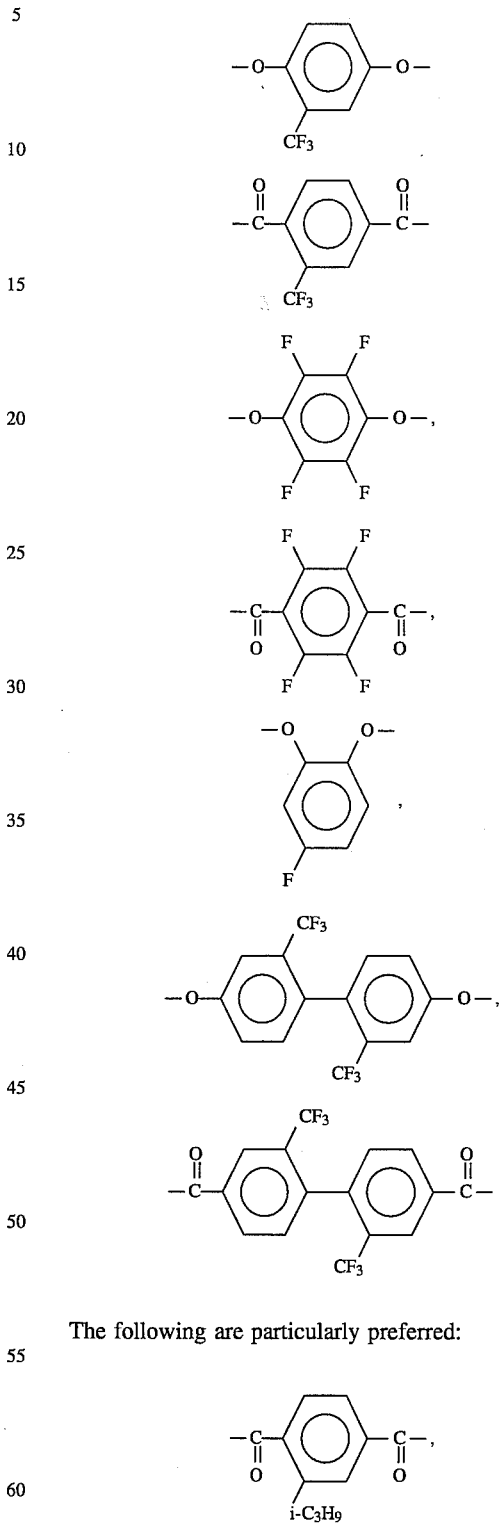
The following are particularly preferred:
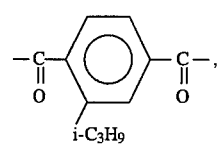

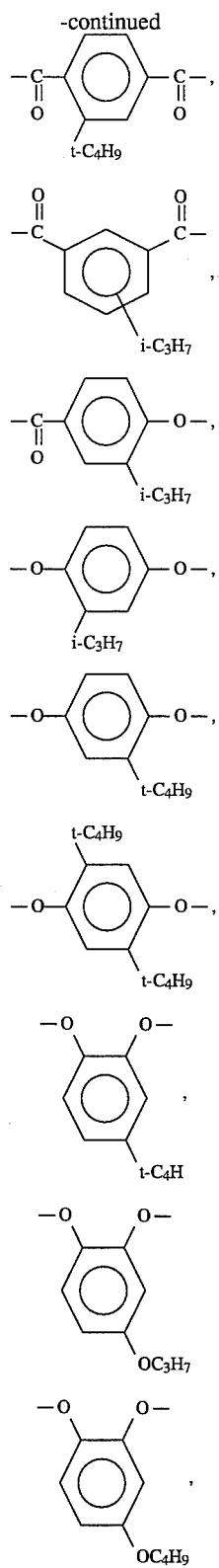
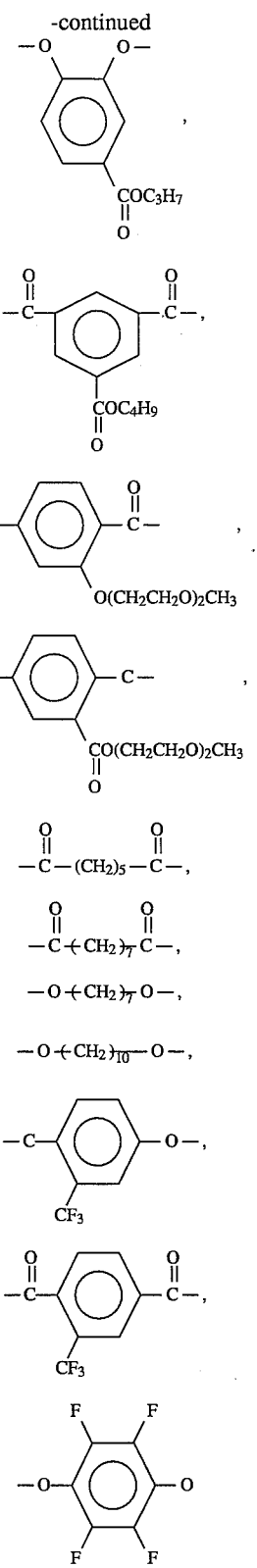

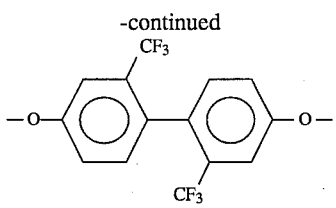

A polyester containing any of the above structural unit in at least one of the foregoing polyester constituent units (a), (b) and (c) acts effectively as a polymer having the tilt orientation property. The proportion of the said structural unit in the polyester is in the range of 1 to 50 mol %, preferably 3 to 40 mol %, more preferably 5 to 30 mol %. If the amount of units necessary For exhibiting the tilt orientation property is smaller than 1 mol %, the desired tilt orientation will not be obtained, so such an amount is undesirable. An amount thereof exceeding 50 mol % is not desirable, either, because of bad influences such as deterioration of the liquid crystal orientation property and that of the flexibility of the resulting film.

Most of such polymers have a bulky substituent group or a fluoric substituent group or contain an aromatic unit wherein main chain-constituting bonds are mete or ortho to each other, as mentioned above, thus generally having the glass fixing ability. As to polymers having the tilt orientation property and capable of being fixed in glassy state, they are employable in the present invention alone or in a combined form with other liquid crystalline polymers (the foregoing cases ①, ② and ③. The following are concrete examples of these polymers:

Polymer consisting essentially of the following structural units:

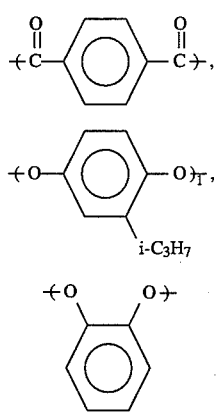

Polymer consisting essentially of the following structural units:

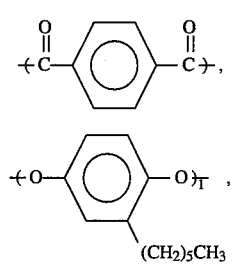

Polymer consisting essentially of the following structural units:

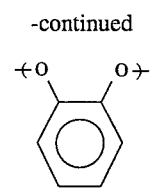

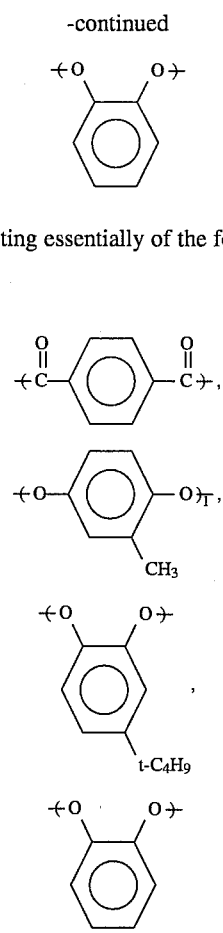

Polymer consisting essentially of the following structural units:

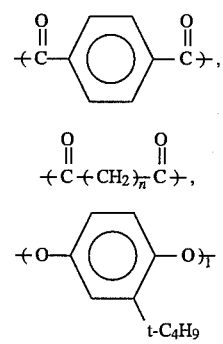

(n = 3–12)

Polymer consisting essentially of the following structural units:

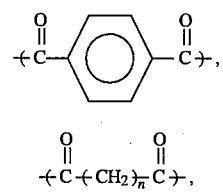

-continued

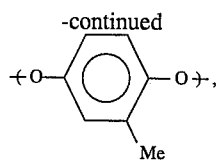

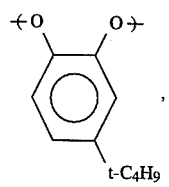

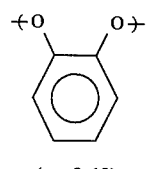

(n = 3–12)

Polymer consisting essentially of the following structural units:

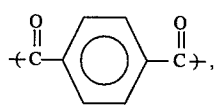

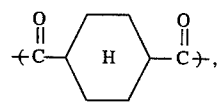

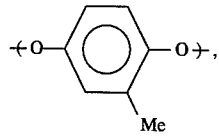

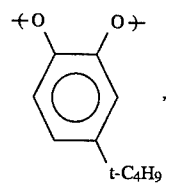

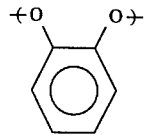

Polymer consisting essentially of the following structural units:

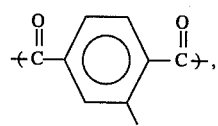

-continued

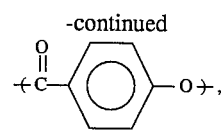

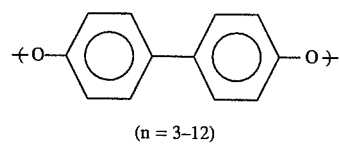

(n = 3–12)

Polymer consisting essentially of the following structural units:

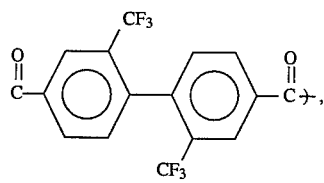

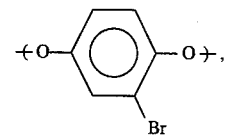

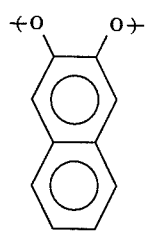

Polymer consisting essentially of the following structural units:

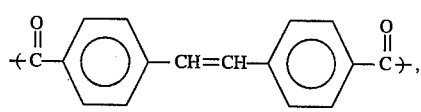

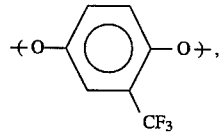

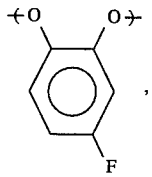

Polymer consisting essentially of the following structural units:

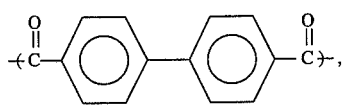

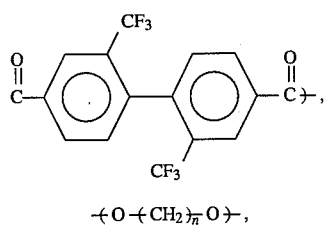

(n = 3-12)

Polymer consisting essentially of the following structural units:

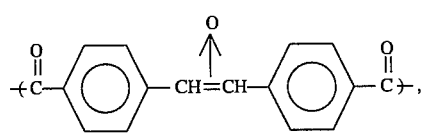

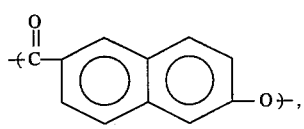

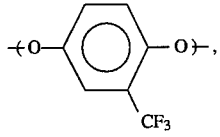

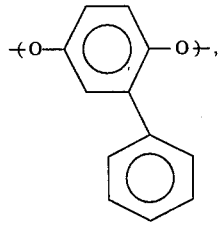

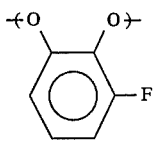

Even polymers having the tilt orientation ability but not having the glass fixing ability can be used in the invention by combining them with other liquid crystalline polymers capable of being fixed in glassy state (the foregoing case ④).

Liquid crystalline polymers capable of being fixed in glassy state are those which can assume a glassy state in a lower temperature portion than the liquid crystal phase. Particularly preferred are polymers containing as a constituent an ortho-substituted aromatic unit wherein main chain-constituting bonds are ortho to each other. As examples there are mentioned those having the following catechol, salicylic acid, phthalic acid, 2,3-naphthalenediol and 2,3-naphthalenedicarboxylic acid units, or substituent groups on these benzene rings:

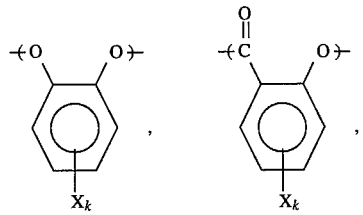

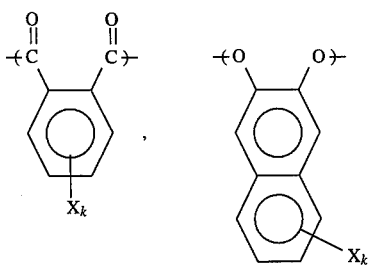

wherein X represents hydrogen, e.g. Cl or Or, methyl, ethyl, methoxy, ethoxy or phenyl, and k is 0 to 2.

The following are particularly preferred:

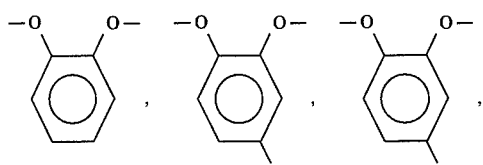

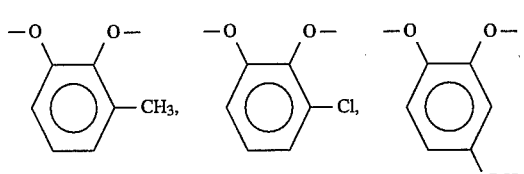

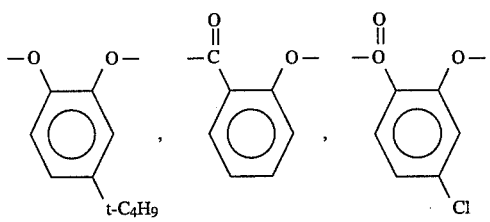

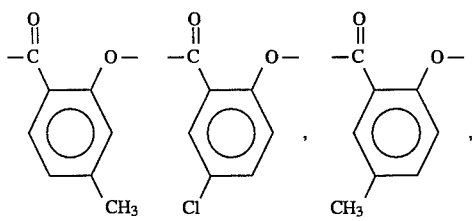

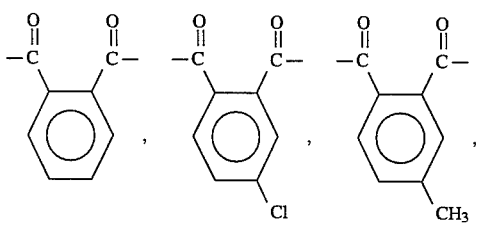

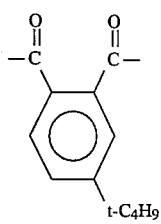

Liquid crystalline polymers capable of being fixed in glassy state and employable in the invention contain such ortho-substituted aromatic units. Examples of other constituent units of polyester, which are (a) dicarboxylic acid unit, (b) diol unit and (c) hydroxycarboxylic acid unit, will be shown below.

Examples of the dicarboxylic acid unit (a) include the following:

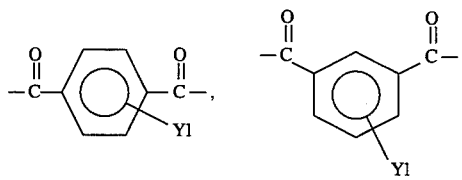

(wherein Y represents hydrogen, halogen, e.g. Cl or Br, methyl, ethyl, methoky, ethoky or phenyl, and l is 0 to 2)

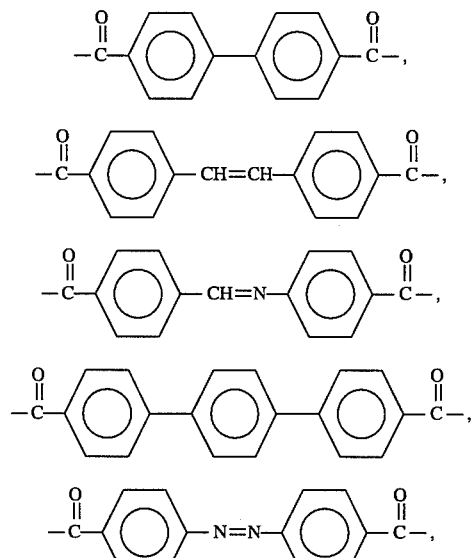

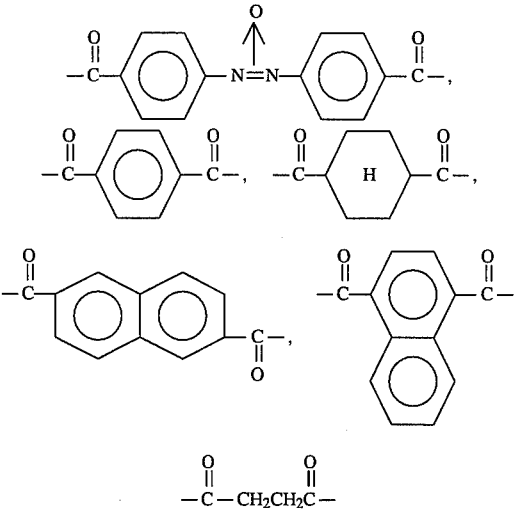

and the like.

Examples of the diol unit(b) include the following:

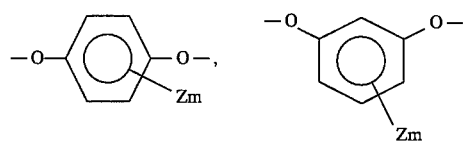

(wherein Z is hydrogen, halogen, e.g. Cl or Br, methyl, ethyl, ethoxy, ethoxy or phemyl, and m=0–2),

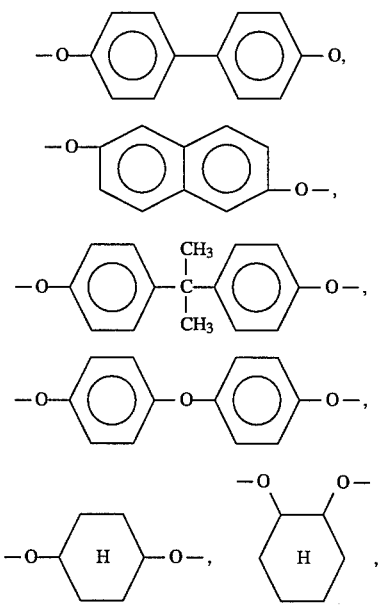

-continued

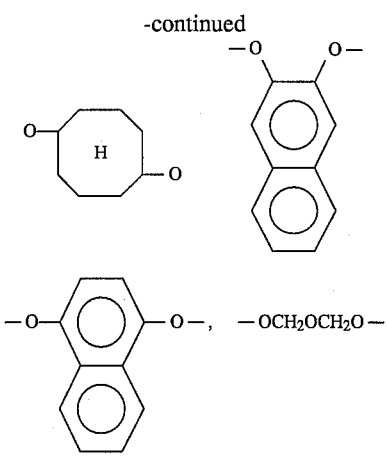

and the like.

Examples of the hydroxycarboxylic acid unit(c) include the following:

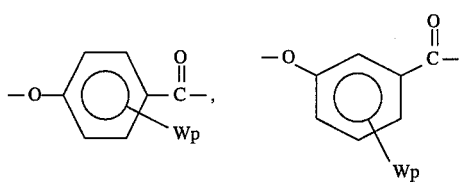

(wherein W is hydrogen, hologen, e.g. Cl or Br, methyl, ethyl, methoxy, ethoxy or phenyl, and p=0–2).

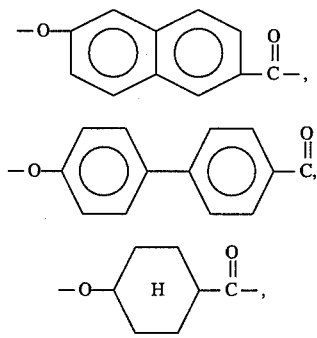

and the like.

As to the molecular weight of these polymers, it is usually in the range of 0.05 to 3.0, preferably 0.07 to 2.0, in terms of an inherent viscosity as measured at 30° C. in any of various solvents, for example, in a mixed phenol/tetrachloroethane (60/40) solvent. If the inherent viscosity is lower than 0.05, the resulting liquid crystalline polymer may be low in strength, while an inherent viscosity value larger than 3.0 will cause an increase of viscosity during the formation of liquid crystal, sometimes resulting in deterioration of the orientation property or increase of the time required for orientation. The glass transition point of each polyester is also important and it exerts an influence also on the stability of orientation after fixed. Assuming that the resulting film is used usually at room temperature or thereabouts, though depending on the purpose of use, it is desirable that the glass transition point of the polyester used be not lower than 0° C., preferably not lower than 30° C., more preferably not lower than 50° C. At a lower temperature, for example at room temperature or thereabouts, a liquid crystal structure once fixed sometimes undergoes a change, which may cause deterioration of the function derived from the liquid crystal structure.

How to prepare the polymers is not specially limited. There may be adopted a polymerization method known in this field such as, for example, a melt polymerization method or an acid chloride method using an acid chloride of a dicarboxylic acid. According to the melt polymerization method, for example, a corresponding dicarboxylic acid and an acetylated compound of a corresponding diol are polymerized together at a high temperature and in a high vacuum. The molecular weight of each polymer can be adjusted easily by controlling the polymerization time or by controlling the feed composition. For accelerating the polymerization reaction there may be used a known metal salt such as sodium acetate. According to the solution polymerization method, a desired polyester can be obtained easily by dissolving predetermined amounts of a dicarboxylic acid dichloride and a diol in a solvent and heating the resulting solution in the presence of an acid acceptor such as pyridine.

In the case of using any of the foregoing compositions ②, ③ and ④ as a liquid crystalline polymer, the proportion of the liquid crystalline polymer having the tilt orientation ability in the composition is usually in the range of 1 to 95 wt %, preferably 5 to 90 wt %, although it cannot be defined sweepingly because it varies according to a desired tilt angle.

By using any of such liquid crystalline polymers as have been described above it is made possible to obtain a tilt orientation, and by further imparting optical activity thereto it is possible to realize a twisted tilt orientation.

The first method for the impartment of optical activity is to introduce an optically active unit into the polymer having the tilt orientation property or the polymer having the glass fixing ability, which were shown in the foregoing ① to ④, or into both structures. The following are examples of such structural unit (the * mark in the following structural formulae represents an optically active carbon):

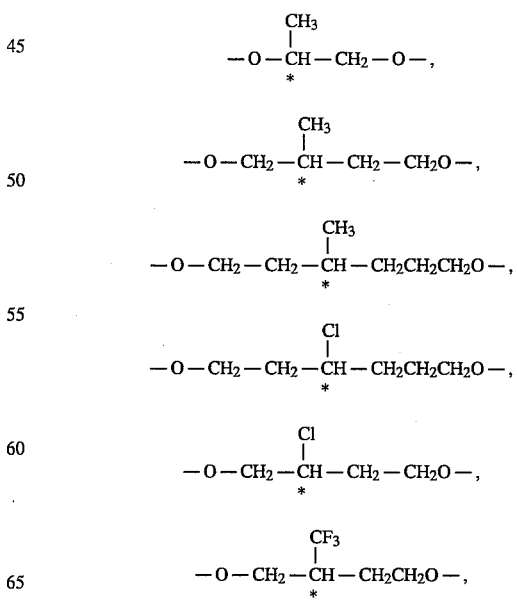

-continued

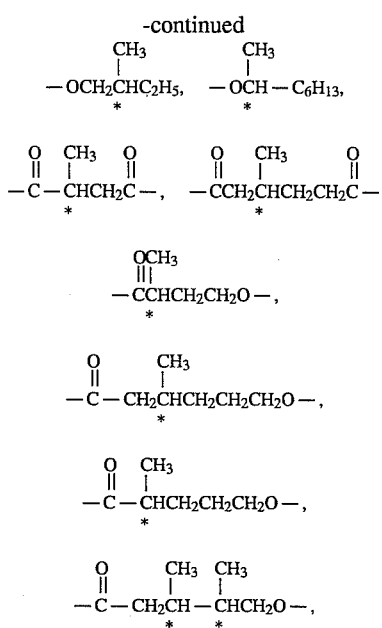

and the like.

The proportion of optically active groups in the above polymers is usually in the range of 0.5 to 80 mol %, preferably 5 to 60 mol %.

The above polymers preferably range in molecular weight from 0.05 to 5.0 in terms of an inherent viscosity as measured at 30° C. in phenol/tetrachloroethane for example. If the inherent viscosity is greater than 5.0, the deterioration of orientation property may result eventually due to a too high viscosity, while a smaller value than 0.05 sometimes results in that the control of composition is difficult.

The second method for the impartment of optical activity is to use a composition comprising any of the foregoing liquid crystalline polymers ① to ④ and an optically active compound incorporated therein.

The optically active compound will now be described. First, optically active, low molecular compounds may be mentioned as typical examples. Any low molecular compound is employable in the invention if only it has optical activity. From the standpoint of compatibility with the base polymer, it is desirable that the low molecular compound be an optically active, liquid crystalline compound. Examples are as follows:

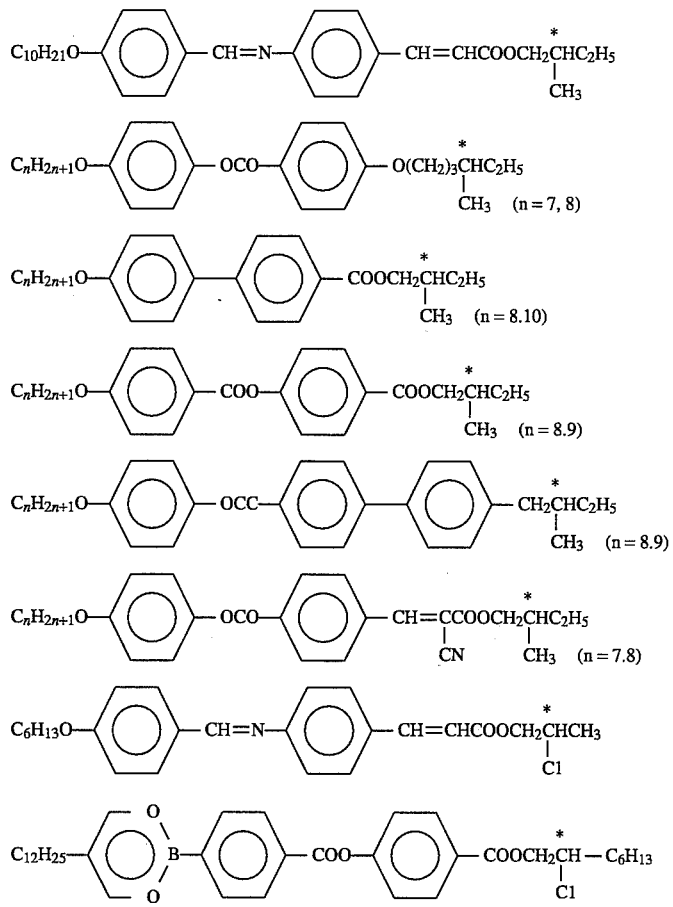

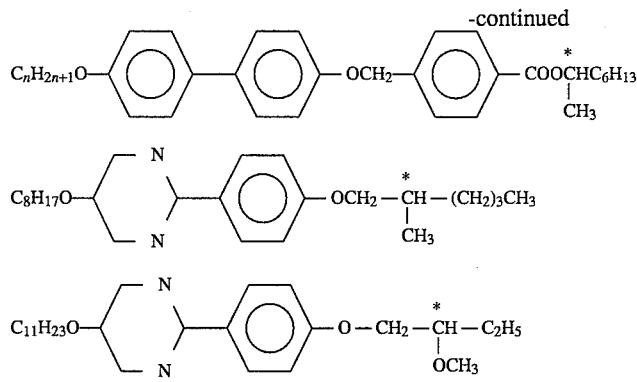

cholesteral derivatives and the like.

Optically active polymers are also mentioned as examples of the optically active compound used in the invention. Any polymer may be used if only it has an optically active group in its molecule, provided that polymers which exhibit liquid crystallinity are preferred from the standpoint of compatibility with the base polymer.

The following liquid crystalline polymers having an optically active group are mentioed as examples: polyacrylates, polymethacrylates, polymalonates, polysiloxanes, polyesters, polyamides, polyester-amides, polycarbonates, polypeptides and cellulose. Optically active polyesters consisting essentially of aromatic units are most preferred in view of their compatibility with the nematic liquid crystalline polymer as a base polymer. Examples are as follows:

Polymer consisting essentially of the following structural units:

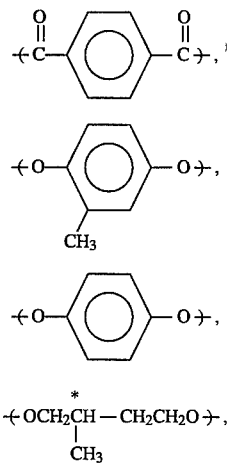

Polymer consisting essentially of the following structural units:

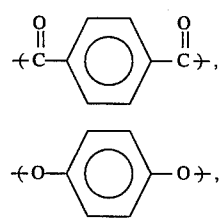

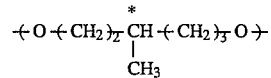

Polymer consisting essentially of the following structural units:

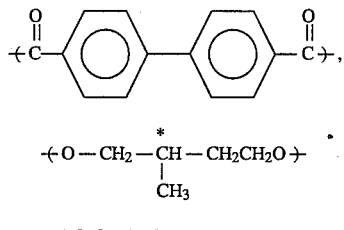

$+O(CH_2)_n O+$ (n = 2 ~ 12)

Polymer consisting essentially of the following structural units:

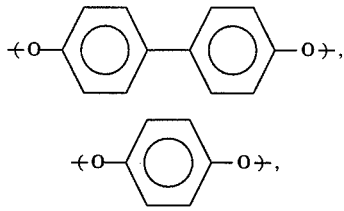

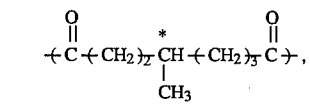

Polymer consisting essentially of the following structural units:

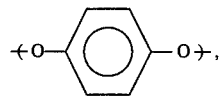

-continued

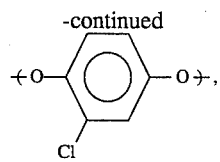

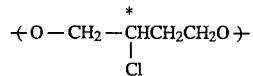

Polymer consisting essentially of the following structural units:

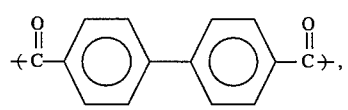

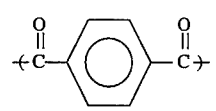

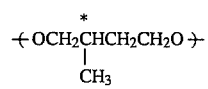

Polymer consisting essentially of the following structural units:

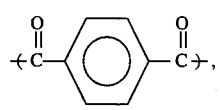

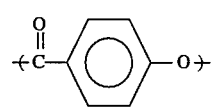

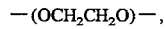

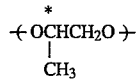

Polymer consisting essentially of the following structural units:

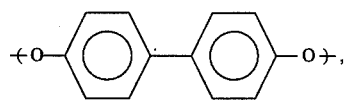

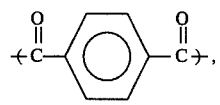

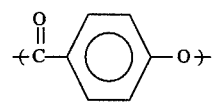

-continued

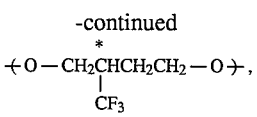

Polymer consisting essentially of the following structural units:

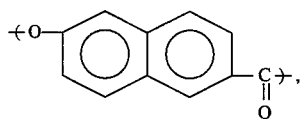

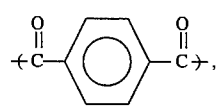

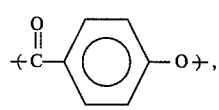

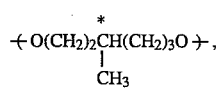

Polymer consisting essentially of the following structural units:

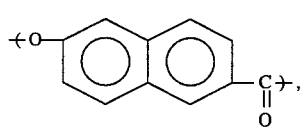

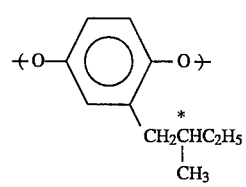

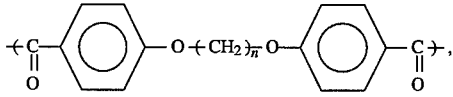

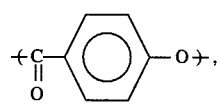

-continued

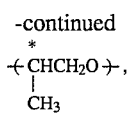

Polymer consisting essentially of the following structural units:

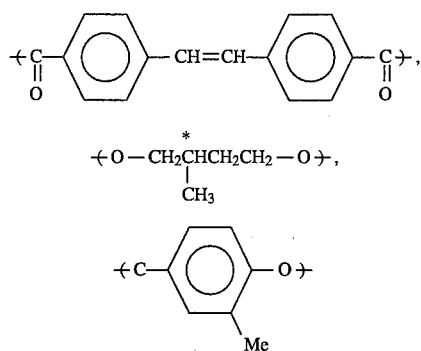

The proportion of optically active groups in the above polymers is usually in the range of 0.5 to 80 mol %, preferably 5 to 60 mol %.

The polymers preferably range in molecular weight from 0.05 to 5.0 in terms of an inherent viscosity as measured at 30° C. in phenol/tetrachloroethane for example. In the case of a higher inherent viscoity than 5.0, the deterioration of orientation property sometimes results due to a too high viscosity, while a smaller inherent viscosity value than 0.05 sometimes results in difficult control of composition.

A composition comprising any of such optically active compounds and the polymer having the tilt orientation property can be prepared, for example, by mixing the two at a predetermined ratio and in a solid, solution or melted state. The proportion of the optically active compound in the composition differs depending on the proportion of optically active groups in the optically active compound used or on the twisting force of the optically active compound for the polymer having the tilt orientation propert, but usually a preferred range thereof is from 0.1 to 60 wt %, more preferably 0.5 to 20 wt %. If the said proportion is less than 0.1 wt %, it may be impossible to impart sufficient twist to the polymer, and if it is more than 60 wt %, the orientation property may be badly influenced.

Description is now directed to the substrate for orientation used in the present invention. The substrate is first required to have anisotropy along its surface like the ordinary substrate for homogeneous orientation. Further, it is preferred that the substrate possess anisotropy for defining a preferential pretilt direction. The term "pretilt" indicates a state in which the director of liquid crystal molecules in the vicinity of the substrate interface is oriented at a certain angle, not 0°, relative to the substrate surface. The term "retilt direction" indicates a direction parallel to the substrate surface corresponding to a molecular direction from an end closer to the substrate toward an end remoter from the substrate in the case where the molecules are in a rising conditionat a certain pretilt angle. Therefore, that there is a preferential pretilt direction indicates that the pretilt direction defined herein is a nearly constant direction. In the case of using a substrate not having a preferential pretilt direction and with pretilt direction not definite, there sometimes is created a region which is tilted in a direction opposite to a main tilt direction. Thus, there is a fear of obstructing a monodomain compound in the liquid crystal layer. Even in the case of a substrate scarcely having any preferential pretilt direction, a preferential pretilt direction of liquid crystal can be defined by the application of an external force such as electric field, magnetic field or shear. In point of easiness of production it is desirable to use a substrate having a preferential pretilt direcion.

As examples of substrates employable in the present invention there are mentioned substrates having a rubbing-treated polyimide film or polyvinyl alcohol film, rubbing-treated or stretched plastic films or sheets, and obliquely vapor-deposited film of silicon dioxide. In the rubbing treatment, for defining a pretilt direction clearly, it is preferred that the direction of surface rubbing with cloth or the like be limted to one direction without reciprocating operation. Typical examples of plastic films or sheets include films or sheets of acrylic resins (e.g. polymethyl methacrylate), polyvinyl alcohol, polystyrene, polycarbonate, polyether sulfone, polyphenylene sulfide, polylefin, polyimide, polyamide-imide, polyether-imide, polyamide, polyether ketone, polyether ether ketone, polyketone sulfide, polysulfone, polyphenylene oxide, polyethylene terephthalate, polybutylene terephthalate, polyacetal, epoxy resin and phenolic resin.

The production of film with (twisted) tilt orientation fixed is performed using any of the foregoing liquid crystalline polymers (including compositions) and a substrate just exemplified above. More specifically, the polymer is applied uniformly onto the substrate, then heat-treated at a liquid crystallization temperature of the polymer to obtain a (twisted) tilt orientation, followed by cooling to fix the (twisted) tile orientation. The application of the polymer to the substrate is performed usually in the state of solution or in a melted state. In the case of using a solution of the polymer, a solvent which is employable differs depending on the kind of the polymer used, but usually any of the following solvents may be used: halogenated hydrocarbons such as chloroform, dichloroethane, tetrachloroethane, trichloroethylene, tetrachloroethylene and o-dichlorobenzene, mixed solvents thereof with phenol, as well as tetrahydrofuran, dimethylformamide, dimethylacetamide, dimethyl sulfoxide and N-methylpyrrolidone. The concentration of the solution differs according to polymer-solvent combinations, but is usually in the range of 5 to 50 wt %, preferably 10 to 30 wt %.

As the polymer solution coating method there may be adopted, for example, spin coating method, roll coating method, printing method, dipping/pulling-up method, or curtain coating method. After the coating, the solvent is removed by drying and then heat treatment is conducted to complete a (twisted) tilt orientation of monodomain. In order to promote the orientation based on an interface effect, the lower the viscosity of the polymer, the better, and hence the higher the heat treatment temperature, the better. However, since the polymer has an isotropic phase in a higher temperature portion than the liquid crystal phase, it is necessary that the heat treatment temperature be lower than an isotropic phase transition temperature. With respect to some polymers, the resulting tilt angle (as well as twist angle) sometimes differs depending on the heat treatment temperature. In this case, it is necessary to set a heat treatment temperature suitable for affording a desired tilt angle (and twist angle). For example, when there occurred the necessity of performing the heat treatment at a relatively low temperature for obtaining a certain tilt structure, since a low temperature causes a high polymer viscosity and requires a long time for orientation, it is effective to adopt a method wherein the heat treatment is performed once at a high temperature to obtain an orientation of monodomain and thereafter the heat treatment temperature is reduced stepwise or gradually to a desired temperature. Anyhow, it is desirable that the heat treatment be conducted at a temperature above the glass transition point of the polymer and below the transition point to an isotropic phase and in accordance with characteristics of the polymer. In general, a suitable temperature range for the heat treatment is from 50° to 300° C., more suitably 100° to 260° C. The heat treatment time necessary for obtaining a satisfactory orientation in the state of liquid crystal on the substrate differs depending on the composition of the polymer used and the heat treatment temperature adopted, so cannot be limited to a certain specific time, but preferably it is in the range of 10 seconds to 120 minutes, more preferably 30 seconds to 60 minutes. If the heat treatment time is shorter than 10 seconds, there will not be obtained a satisfactory orientation, while a longer time than 120 minutes will lead to deterioration of productivity. In this way there can be obtained a uniform (twisted) tilt orientation over the whole substrate surface in the state of liquid crystal.

By subsequent cooling to a temperature below the glass transition point of the polymer, the oriented state thus obtained can be fixed as it is without impairing the uniformity of the orientation at all. Generally, in the case of using a polymer having a crystal phase in a lower temperature portion than the liquid crystal phase, there is a fear that the orientation in the state of liquid crystal will be destroyed by cooling. Such a phenomenon does not occur in the present invention because of using a polymer which assumes a glass phase at a temperature below the temperature region exhibiting liquid crystal phase, so that it is possible to fix the state of (twisted) tilt orientation of a completely monodomain structure. The cooling speed is not specially limited. A transfer from the heated atmosphere into an atmosphere held below the glass transition point of the polymer permits the orientation to be fixed. Forced cooling such as air cooling or water cooling may be performed for enhancing the production efficiency. With respect to certain polymers, however, the resulting tilt angle (as well as twist angle) may somewhat differ depending on the cooling speed. In the case of using such a polymer and when it is necessary to strictly control the said angle(s), it is preferable that the colling operation be carried out under controlled conditions.

The liquid crystalline polymer film on the substrate thus obtained can be used as it is as a transmission type if the substrate is transparent, while if the substrate is of a low transmittance such as a polyimide substrate for example, the film can be applied to a use which utilizes reflection characteristic. According to another film producing method in the present invention, the liquid crystal on the substrate is once fixed its orientation and thereafter the liquid crystal layer is separated from the substrate and transferred onto another substrate more suitable for optical use. For example, in the case where the orienting substrate used is necessary for obtaining a tilt orientation but will exert an undesirable influence on the properties of the resulting film for use as an optical element, the substrate may be removed from the liquid crystal layer after fixing of the orientation. In this case, the liquid crystal layer itself sometimes does not have a self-supporting property in some particular film thickness, but there can be adopted, for example, a method of fixing the liquid crystal layer through an adhesive or the like onto another substrate which is desirable from the standpoint of optical properties.

The film thickness is not specially limited, but usually it is in the range of 0.1 to 50 μm, preferably 0.5 to 30 μm.

The thus-obtained liquid crystalline polymer film with tilt orientation or twisted tilt orientation fixed may be used as it is or after forming thereon a protective layer of a transparent plastic material for protection of the film surface. It may be combined with another optical element such as a polarizing plate.

According to the present invention, as set forth hereinabove, there is provided a process for producing a liquid crystalline polymer film wherein the liquid crystalline polymer molecules constituting the film are oriented in a tilted state or in a twisted and tilted state, although in the prior art it has been impossible to obtain such a film. Since this film exhibits quite a new optical performance based on the novel orientation structure, it can be applied to various optical uses, including application to a liquid crystal display and the like, and thus it is of great industrial value.

A typical use thereof is a compensator. The construction of the compensator according to the present invention is as mentioned previously as item (5). A preferred mode of the compensator is a compensator for a liquid crystal display characterized by using a transparent substrate which is a glass sheet or a glass sheet having an alignment film on the surface thereof or which is a plastic film or a plastic film having an alignment film on the surface thereof.

In another preferred mode, the liquid crystalline polymer used is a high molecular compound containing an optically active unit or a liquid crystalline polymer composition containing an optically active compound and assumes a glassy state at a temperature below its liquid crystal transition point.

As mentioned previously, the liquid crystalline polymer film thus obtained can be used as it is as a compensator if the orienting substrate used is transparent and isotropic optically. Even a liquid crystalline polymer film of low transmittance such as a polyimide substrate can be to a use which utilizes reflection characteristic.

According to another compensator fabricating method in the present invention, the liquid crystalline polymer used is once oriented and fixed on a substrate, then the liquid crystal layer is separated from the substrate and transferred onto another substrate more suitable for optical use. For example, when the orienting substrate used is necessary for obtaining a twisted tilt orientation but will exert an undesirable influence on the properties of the resulting film to be used as an optical element, the substrate may be removed from the liquid crystal layer after fixing of the orientation. In this case, the liquid crystal layer itself may be free from a self-supporting property in some particular film thickness, but it is possible to adopt, for example, a method of fixing the liquid crystal layer through an adhesive or the like onto another substrate which is desirable in point of optical properties. As examples of transparent substrates suitable for this purpose there are mentioned substrates formed using such materials as polymethacrylate, polycarbonate, polyvinyl alcohol, polyether sulfone, polysulfone, polyarylate, polyimide, polyolefin and triacetyl cellulose.

In the thus-obtained compensator with twisted tilt orientation fixed, the twist angle can be controlled freely by suitably selecting the quantity and kind of optically active units, and the tilt angle can also be controlled freely by suitably selecting the kind of polymer, composition ratio and conditions for heat treatment, so that a great effect is exhibited not only in color compensation but also in improving the viewing angle characteristic. The compensator may be used as it is or after the formation thereon of a protective layer of a transparent plastic material for protection of its surface. It may be combined with another optical element such as a polarizing plate. As an example of use there is first mentioned a compensator for STN-LCD. The compensator according to the invention is also effective in the color compensation of other modes of LCDs such as TFT-LCD, OMI-LCD and ECB-LCD.

EXAMPLES

The following examples are given in iullustration of, not in limitation of, the present invention. In those examples there were used the following analyzing methods.

(1) Determination of Polymer Composition

Polymer was dissolved in deuterated chloroform or deuterated trifluoroacetic acid and the polymer composition was determined using 400 MHz 'H-NMR (JNM-GX400, a product of Japan Electron Optics Laboratory Co., Ltd.)

(2) Determination of Inherent Viscosity

Determined in a mixed phenol/tetrachloroethane (60/40 weight ratio) solvent at 30° C. using a Ubbelohde's viscometer.

(3) Determination of Liquid Crystal Phase Series

Determined by measurement using DSC (DuPont 990 Thermal Analyzer) and observation using an optical microscope (BH2 Polarizing Microscope, a product of Olympus Optical Co., Ltd.).

(4) Measurement of Refractive Index

Measured using an Abbe's refractometer (Type-4, a product of Atago K.K.).

(5) Determination of Parameters of Compensator

Twist angle and retardation (the product of film thickness and briefringence) were determined by applying a linearly polarized light perpendicularly to a compensator and subjecting the transmitted light to polarization analysis using an ellipsometer. Tilt angle was determined on the basis of incidence angle dependency of the state of polarization of transmitted light upon incidence of a linearly polarized light obliquely on a sample and incidence angle dependency of transmitted polarization spectrum in this condition.

EXAMPLE 1

Using 100 mmol of terephthalic acid, 50 mmol of hydroquinone diacetate, 50 mmol of tert-butylcatechol diacetate and 100 mg of sodium acetate, polymerization was conducted in a nitrogen atomosphere at 300° C. for 1 hour. The resulting polymer was dissolved in tetrachloroethane and subsequent reprecipitation with methanol afforded 25.0 g of purified polymer. The polymer had an inherent viscosity of 0.30 and had a nematic phase as a liquid crystal phase. Its isotropic phase—liquid crystal phase transition temperature was above 300° C. and glass transition point was 130° C.

A 10 wt % solution of this polyester in tetrachloroethan e was prepared. The solution was then applied onto a soda glass plate by screen printing, then dried, heat-treated at 220° C. for 30 minutes and thereafter cooled to afford a uniformly oriented liquid crystal film having a thickness of 50 μm. Upon conoscope observation the liquid crystalline polymer proved to have a positive uniaxial structure and was found to have a homeotropic orientation property.

EXAMPLE 2

The polymer of formula (1) was prepared. It was found to have an inherent viscosity of 0.35, a nematic phase as a liquid crystal phase, an isotropic phase—liquid crystal phase transition temperature of above 300° C. and a glass transition point of 105° C. A 10 wt % solution of this polyester in tetrachloroethane was prepared, then applied onto each of various substrates for the test of orientation property by screen printing, thereafter dried and heat-treated at 250° C. for 30 minutes. As the substrates there were used soda glass, borosilicate glass, polyethylene terephthalate film, polyimide film, polyether-imide film, polyether ether ketone film and polyether sulfone film. On microscopic observation of liquid crystal phase, Schlieren texture was observed on all of the substrates and this polymer was found to have a homogeneous orientation property:

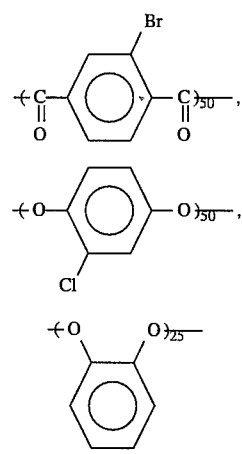

EXAMPLE 3

Figure 2:
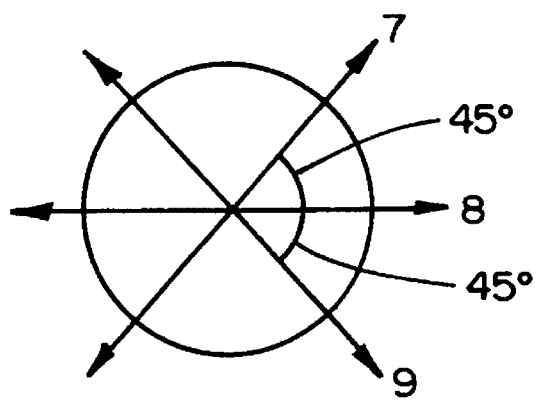
FIG. 2 depicts the axis directives of the optical measurement system of FIG. 1 when viewed from above.
Figure 3:
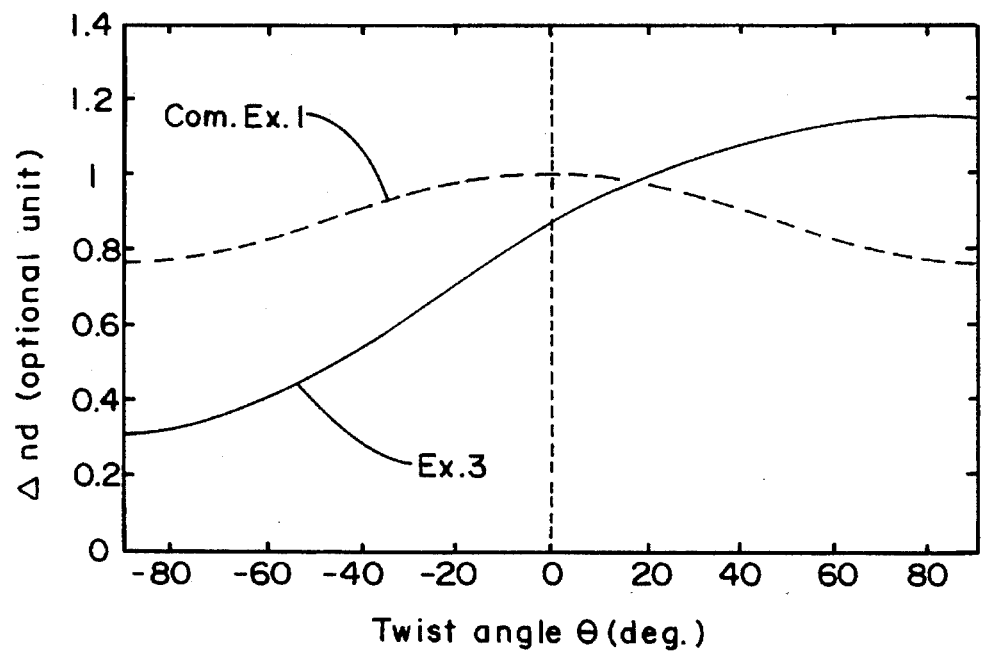
FIG. 3 is a graph showing the results measured for the relation between the apparent retardation value and the sample tilt angle (as indicated by the solid line) in Example 3 and the result obtained in Comparative Example 1 in which the sample was not tilted (as indicated by the dotted line)

5 g of the polymer described in Example 1 and 5 g of the polymer of formula (1) in Example 2 were mixed and dissolved in 90 g of tetrachloroethane. The resulting solution was applied onto a glass substrate having a rubbed polyimide film by spin coating, then dried, heat-treated in an oven at 220° C. for 30 minutes and thereafter cooled with air to afford a transparent 6 μm thick film. Such an optical measurement system as shown in FIGS. 1 and 2 was provided and a sampel was tilted in the rubbing direction of the substrate to check an apparent retardation (the product of birefringence Δn and film thickness d). As to the relation between the sample tilt angle θ and the apparent retardation value, as indicated with a solid line in FIG. 3, there is obtained an asymmetric curve upon perpendicular incidence (θ=0°) of light on the sample, and it turned out that the liquid crystal molecules were tilted with respect to the substrate. As a result of simulation, an average apparent tilt angle was estimated at about 20° relative to the substrate.

COMPARATIVE EXAMPLE 1

Using only the polymer of formula (1), there was prepared a 10 wt % solution in tetrachloroethane. The solution was then applied onto a glass substrate having a rubbed polyimide film, then dired, heat-treated at 220° C. for 30 minutes and thereafter cooled with air to afford a transparent film having a thickness of about 6.5 μm. An optical measurement similar to that in Example 3 was conducted to obtain a curve indicated with a dotted line in FIG. 3. In this case, the curve is symmetric right and left with respect to θ=0°. Thus, it turned out that when the polymer of formula (1) having a homegeneous orientation property was used alone, it was impossible to obtain a tilted structure.

EXAMPLE 4

The polymer of formula (2) having a homeotropic orientation property and the polymer of formula (3) having a homogeneous orientation property were prepared. The polymer of formula (2) had an inherent viscosity of 0.2, possessing a crystal phase under a liquid crystal phase (liquid crystal phase—crystal phase transition temperature: 180° C.). The polymer of formula (3) had an inherent viscosity of 0.25, possessing a glass phase under a liquid crystal phase (Tg=95° C.). The polymer of formula (2) and the polymer of formula (3) were mixed at a weight ratio of 1:2 and then dissolved in chloroform to prepare a 5 wt % polymer solution. The solution was then applied onto a glass substrate with a rubbed polyimide film by means of a roll coater, then dried, heat-treated at 200° C. for 30 minutes and cooled with air. The resulting film on the glass substrate was transparent and not crystallized. An apparent tilt angle was about 15°:

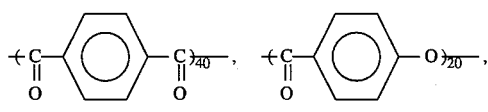
(2)

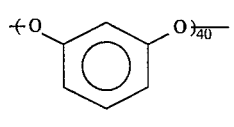

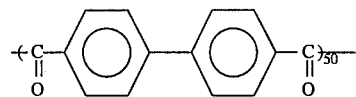
(3)

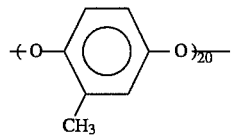

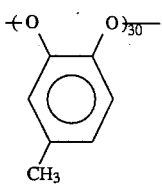

EXAMPLE 5

Figure 4:
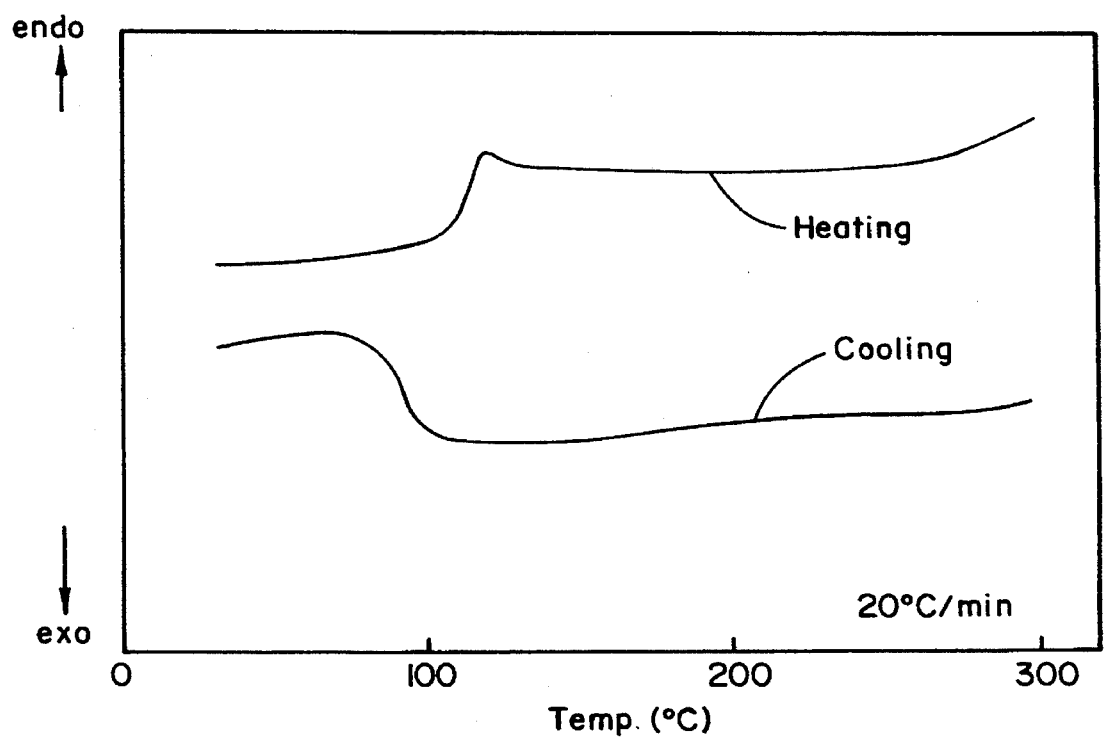
FIG. 4 is a DSC chart for the composition of Example 4.

A polymer composition obtained by evaporation of the chloroform solution used in Example 4 was subjected to differential scanning calorimetry (DSC) to obtain the chart of FIG. 4. Under a liquid crystal phase was present only a glass phase, with no crystal phase observed.

EXAMPLE 6

The polymer of formula (4) having ahomeotropic orientation property and the polymer of formula (5) having ahomogeneous orientation property were prepared by an acid chloride method, then mixed at a weight ratio of 1:9 or 2:8 and dissolved in a mixed tetrachloroethane/phenol (4:6 weight ratio) solvent to prepare 15 wt % polymer solutions for the above weight ratios, respectively. The solutions were each applied onto a glass substrate with a rubbed polyvinyl alcohol film, then dried and heat-treated to afford a polymer film having a thickness of about 4 μm and having a tilt orientation. When the polymer (4): polymer (5) ratio was 9:1, an apparent tilt angle of 10°, while when the said ratio was 8:2, an apparent tilt angle was 17°

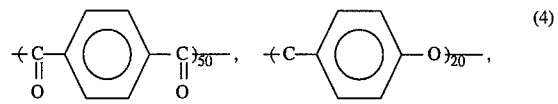
(4)

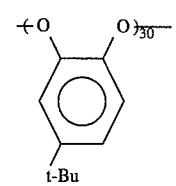

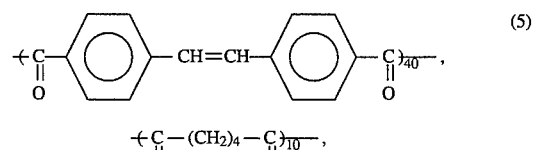
(5)

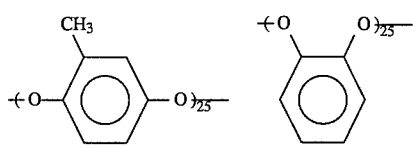

EXAMPLE 7

The polymer of formula (6) was prepared and then oriented on a flint glass substrate. As a result, a homeotropic orientation was obtained. This sample was subjected to measurement using a refractometer to find that ne=1.74 and no=1.54. Therefore, birefringence Δn was estimated at 0.20.

When the polymer of formula (7), exhibiting a homogeneous orientation behavior, was oriented on a flint glass substrate having a rubbed polymide film, there was obtained a homogeneous orientation of monodomain. ne=1.76, no=1.57, Δn=0.19.

When a 1:1 (weight ratio) composition comprising the polymers (6) and (7) was oriented on a glass substrate having a rubbed polyimide film, there was obtained a transparent film. Thickness d=5.2 μm, retardation Δnd=0.53 μm, from which apparent A n is estimated at 0.10, thus showing a much smaller value than the birefringence values of the constituent polymers (6) and (7) of the composition. This fact suggests that the composition comprising the polymers (6) and (7) is oriented in a tilted state:

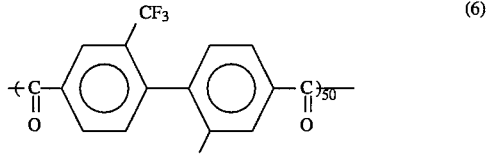
(6)

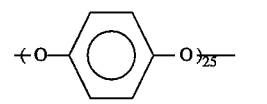

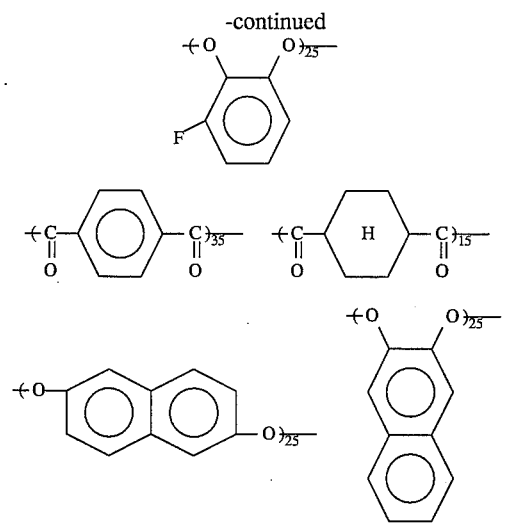

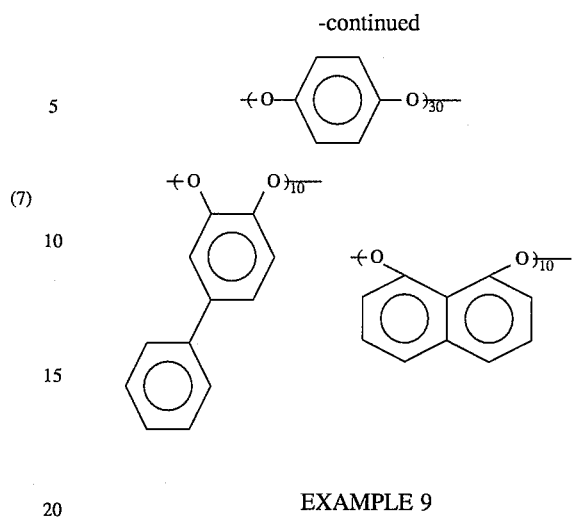

EXAMPLE 8

Figure 5:
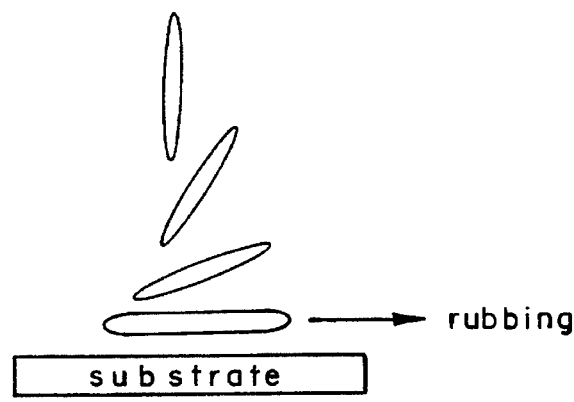
FIG. 5 is a conceptive view of the orientation structure in Example 8.

The polymer of formula (8) (2-methylbutanediol unit is a racemate) having a homeotropic orientation property and the polymer of formula (9) having a homogeneous orientation property were melt-mixed together at a weight ratio of 3:2 to prepare a composition. The composition was then heated to 260° C. and applied in a melted state to a glass substrate of high refractive index (n=1.84) having a rubbed polyimide film, followed by cooling with air to fix the resulting orientation, thereby affording a transparent polymer film having a thickness of 10 μm. This sample was measured for refractive index near the interface, using a refractometer. As a result, the values of refractive index of the polymer near the polymer-air interface were almost equal, n=1.57, in any direction in a plane of the polymer, and in the thickness direction, n was found to be 1.72. On the other hand, at the polyimide-polymer interface, n=1.72 in a direction parallel to the rubbing direction, n=1.5 in a direction perpendicular to the rubbing direction in a plane of the polymer, and n=1.57 in the thickness direction. From these results the composition was presumed to have such an orientation structure as shown in FIG. 5:

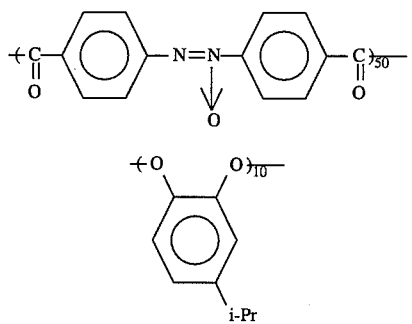

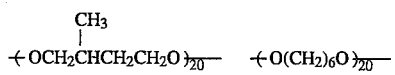

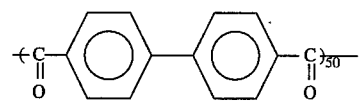

EXAMPLE 9

Using 80 mmol of terephthalic acid, 20 mmol of pimelic acid, 50 mmol of hydroquinone diacetate, 50 mmol of isopropylcatechol diacetate and sodium acetate as catalyst, polymerization was performed at 280° C. for 2 hours and at 300° C. for 2 hours to prepare the polymer of formula (10). The polymer was then dissolved in tetrachloroethane and subsequent reprecipitation with methanol afforded 27 g of purified polymer. Inherent viscosity of this polymer was 0.30. As a result DEC and observation using a polarizing microscope, the polymer was found to have a nematic liquid crystal phase, not having a crystal phase in a lower temperature portion than the liquid crystal phase, and have a Tg (glass transition temperature) of 118° C.

Using this polyester, there was prepared a 10 wt % solution in tetrachloroethane. The solution was then applied onto a glass substrate with a rubbed polyimide film having a certain rubbing direction and a predetermined preferential pretilt direction, by spin coating, then dried, heat-treated at 220° C. for 30 minutes and thereafter cooled to afford a uniformly oriented, transparent liquid crystal film having a thickness of 5 μm.

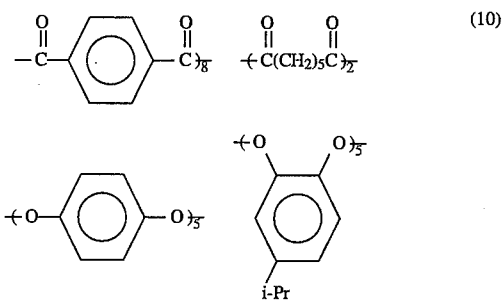

(Hereinafter, the numerical value for each unit in the formula represents a molar composition ratio.)

EXAMPLE 10

Using the optical measurement system shown in FIGS. 1 and 2, the liquid crystal film produced in Example 9 was tilted in the rubbing direction of the substrate and the value of retardation (the product of birefringence Δn and film thickness d) was measured. A maximum retardation value was obtained at a tilt angle θ of 24°. This film was found to have a tilt angle of 24° and with nematic orientation, i.e. tilt orientation, fixed.

COMPARATIVE EXAMPLE 2

The polymer of formula (11) was prepared in the same way as in Example 9 except that catechol diacetate was used in place of isopropylcatechol diacetate. Inherent viscosity of the polymer was 0.27. As a result of DSC and observation using a polarizing microscope, the polymer was found to have a nematic liquid crystal phase, have a glass phase, not a crystal phase, in a lower temperature portion than the liquid crystal phase, and have a Tg of 115° C. A liquid crystal film was produced in the same manner as in Example 9 and then measured for retardation value by the method described in Example 10. A maximum retardation value was obtained at θ=1.8° and the tilt angle was 1.8°. Thus, it turned out that unlike the film obtained in Example 9, the film obtained in this comparative example was little tilted in its orientation but was an ordinary nematic film with homogeneous orientation fixed.

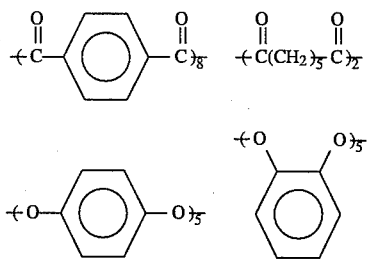
(11)

EXAMPLE 11

The polymers of formulae (12) and (13) were prepared in the same way as in Example 9. The values of inherent viscosity, $\eta_{inh}$, of the polymers were 0.22 and 0.25, respectively. Both polymers were each found to have a glass phase in a lower temperature portion than the liquid crystal phase and have 110° C. and 115° C., respectively, as Tg.

Then, using a polymer mixture containing 20 wt % of the polymer of formula (12) and 80 wt % of the polymer of formula (13), there was prepared a 10 wt % solution in tetrachloroethane. The solution was applied onto a 100 μm thick polyacrylate film with a rubbed polyimide film having a certain rubbing direction and a predetermined preferential pretilt direction, by printing, then dried, heat-treated at 250° C. for 30 minutes and thereafter cooled to 220° C. slowly over a 30 minute period to afford a uniformly oriented, transparent liquid crystal film having a thickness of 5.9 μm.

The value of retardation was measured while tilting the film in the manner described in Example 10; as a result, a maximum value was obtained at θ=30°. Thus, it turned out that this film has a tilt angle of 30° and with nematic orientation, i.e. tilt orientation, fixed.

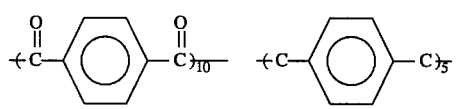
(12)

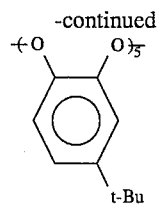

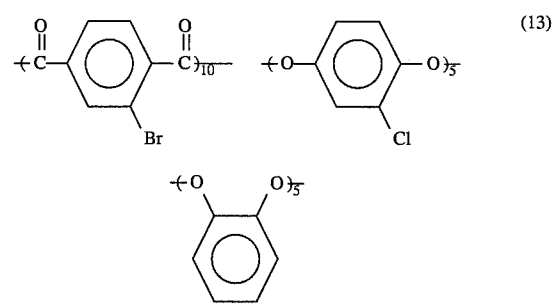
(13)

COMPARATIVE EXAMPLE 3

The polymer of formula (14) was prepared. This polymer corresponds to a polymer obtained by replacing the t-butylcatechol unit in the polymer of formula (12) with methylcatechol unit. Then, a liquid crystal film was produced in the same way as in Example 11 except that the polymer of formula (14) was used in place of the polymer of formula (12). When the value of retardation of this film was measured, a maximum value was obtained at θ=1.5°. Thus, it turned out that unlike the film obtained in Example 11 this film was little tilted in its orientation and was an ordinary nematic film with its director generally parallel to the substrate surface.

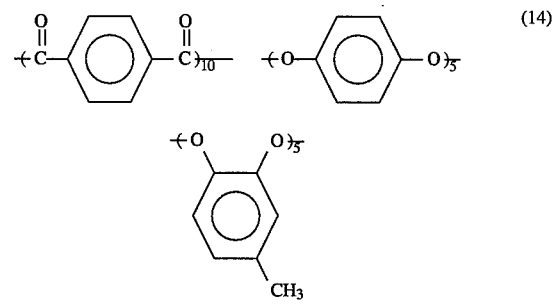
(14)

EXAMPLE 12

The polymer of formula (15) was prepared in the same way as in Example 9. This polymer was found to have an inherent viscosity, $\eta_{inh}$, of 0.20, have a glass phase, not a crystal phase, in a lower temperature portion than the liquid crystal phase and have a Tg of 107° C. Likewise, the polymer of formula (16) was prepared, which polymer proved to be a crystalline polymer having a $\eta_{inh}$ of 0.20 and not having a glass phase under the liquid crystal phase.

Next, using a polymer mixture containing 70 wt % of the polymer of formula (15) and 30 wt % of the polymer of formula (16), there was prepared a 15 wt % solution in dimethylformamide. The solution was applied onto a 100 μm thick polyacrylate film having a rubbed polyimide film, by printing, then dried, heat-treated at 250° C. for 30 minutes and thereafter cooled to 220° C. slowly over a 30 minute period to afford a uniformly oriented, transparent liquid crystal film having a thickness of 3.5 μm.

The value of retardation was measured while tilting the film in accordance with the method described in Example 10; as a result, a maximum value was obtained at θ=24°. Thus, it turned out that this film had a tilt angle of 24° and with nematic orientation, i.e. tilt orientation, fixed.

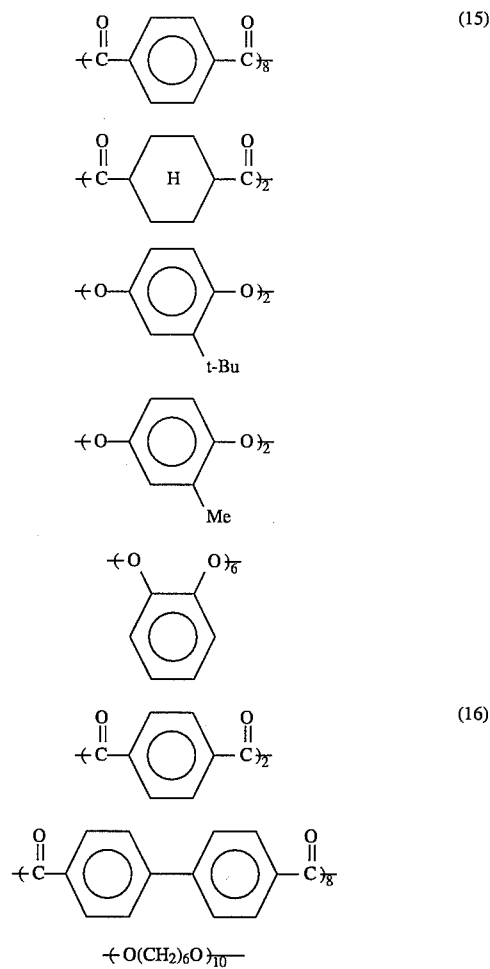

EXAMPLE 13

The polymer of formula (17) was prepared in the same way as in Example 9. This polymer was found to have a $\eta_{inh}$ of 0.15, have a glass phase, not a crystal phase, in a lower temperature portion than the liquid crystal phase and have a Tg of 89° C. Likewise, the polymer of formula (18) was prepared, which polymer proved to have a $\eta_{inh}$ of 0.17 have a crystal phase, not a glass phase, in a lower temperature portion than the liquid crystal phase.

Next, using a polymer mixture containing 80 wt % of the polymer of formula (17) and 20 wt % of the polymer of formula (18), there was prepared a 15 wt % solution in N-methylpyrrolidone. This solution was applied by printing onto a 75 μm thick polyether sulfone film having a rubbed polyimide film, then dried, heat-treated at 250° C. for 30 minutes thereafter cooled to 220° C. rapidly and further heat-treated at 220° C. for 30 minutes to afford a uniformly oriented, transparent liquid crystal film having a thickness of 5.2 μm.

The value of retardation was measured while tilting the film in accordance with the method described in Example 10; as a result, a maximum value was obtained at θ=18°. Thus, this film proved to have a fixed nematic orientation, or tilt orientation, having a tilt angle of 18°.

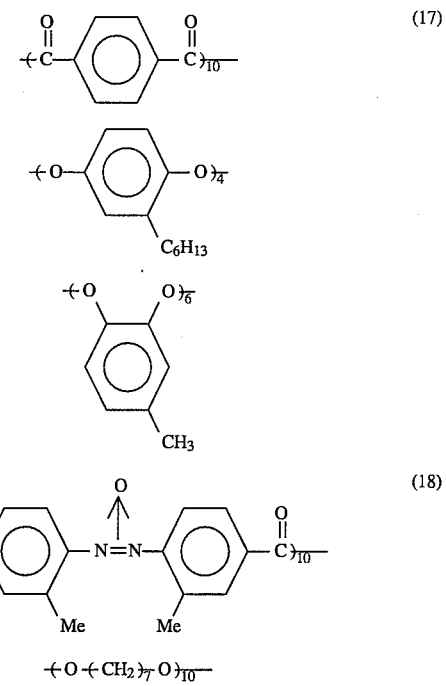

EXAMPLE 14

The polymer of formula (19) was prepared in the same way as in Example 9, which polymer proved to have a $\eta_{inh}$ of 0.18, have a glass phase, not a crystal phase, in a lower temperature portion than the liquid crystal phase and have a Tg of 109° C. Likewise, the polymer of formula (20) was prepared, which polymer was found to have a $\eta_{inh}$ of 0.12, have a glass phase, not a crystal phase, in a lower temperature portion than the liquid crystal phase and have a Tg of 68° C.

Next, using a polymer mixture containing 10 wt % of the polymer of formula (19) and 90 wt % of the polymer of formula (20), there was prepared a 15 wt % solution in a mixed phenol/tetrachloroethane (6/4 weight ratio) solvent. This solution was applied by printing onto a 75 μm thick polyether sulfone film having a rubbed polyimide film, then dried, heat-treated at 250° C. for 30 minutes, thereafter cooled to 220° C. rapidly and further heat-treated at 220° C. for 30 minutes to give a uniformly oriented, transparent liquid crystal film having a thickness of 4.8 μm.

Then, the value of retardation was measured while tilting the film in accordance with the method described in Example 10; as a result, a maximum value was obtained at θ=40°. Thus, this film was found to have a fixed nematic orientation, or tilt orientation, having a tilt angle of 40°.

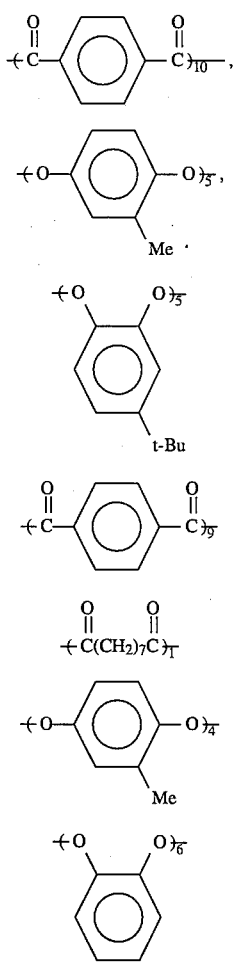

EXAMPLE 15

A liquid crystal film was produced in the same way as in Example 12 except that the heat treatment conditions were changed. More specifically, the application of the solution onto the polyether sulfone film by printing was followed by drying, heat treatment at 240° C. for 30 minutes and subsequent rapid cooling to room temperature, thereby affording a uniformly oriented, transparent liquid crystal film having a thickness of 4.9 μm. This film proved to have a fixed tilt orientation with a tilt angle of 26°.

EXAMPLE 16

The polymers of formulae (21) and (22) were prepared by an acid chloride method. The polymer of formula (21) had a $\eta_{inh}$ of 0.29, exhibiting a nematic liquid crystallinity, but had a crystal phase in a lower temperature portion than the liquid crystal phase. The polymer of formula (22) had a $\eta_{inh}$ of 0.21 and it was a polymer vitrifying at a Tg of 106° C.

Next, using a polymer mixture containing 5 wt % of the polymer of formula (21) and 95 wt % of the polymer of formula (22), there was prepared a 10 wt % solution in a mixed phenol/tetrachloroethane (6/4 weight ratio) solvent. This solution was applied onto a rubbed, 75 μm thick polyether ether ketone film having a certain rubbing direction and a predetermined preferential pretilt direction, by spin coating, then dried, heat-treated at 260° C. for 60 minutes, thereafter cooled to 180° C. rapidly and further heat-treated at 180° C. for 60 minutes to give a uniformly oriented, transparent liquid crystal film having a thickness of 7.2 μm.

Then, using an adhesive, a 50 μm thick polyether sulfone film was laminated to the liquid crystal layer side of the film. After curing of the adhesive, only the polyether ether ketone film was peeled off slowly, allowing the liquid crystal layer to be transferred onto the polyether sulfone film.

Then, the value of retardation was measured while tilting the thus-fabricated film in accordance with the method described in Example 10; as a result, a maximum value was obtained at θ=19°. Thus, this film proved to have a fixed nematic orientation, or tilt orientation, with a tilt angle of 19°.

EXAMPLE 17

The polymers of formulae (23) and (24) were prepared in accordance with an acid chloride method. The polymer of formula (23) had a $\eta_{inh}$ of 0.12, exhibiting a nematic liquid crystallinity and was found to have a glass phase in a lower temperature portion than the liquid crystal phase and have a Tg of 88° C. The polymer of formula (24) had a $\eta_{inh}$ of 0.13 and it was a nematic liquid crystalline polymer vitrifying at a Tg of 84° C.

Next, using a polymer mixture containing 50 wt % of the polymer of formula (23) and 50 wt % of the polymer of formula (24), there was prepared a 20 wt % solution in tetrachloroethane. This solution was applied onto a rubbed polyphenylene sulfide film having a thickness of 50 μm, the dried, heat-treated at 210° C. for 30 minutes, thereafter cooled to 170° C. rapidly and further heat-treated at 170° C. for 30 minutes to give a uniformly oriented, transparent liquid crystal film having a thickness of 5.9 µm.

Then, using an adhesive, a 50 µm thick triacetyl cellulose film was laminated to the liquid crystal layer side of the film, and after curing of the adhesive, the polyphenylene sulfide film was peeled off slowly, allowing the liquid crystal layer to be transferred onto the triacetyl cellulose film.

Then, the value of retardation was measured while tilting the thus-fabricated film in the manner described in Example 10; as a result, a maximum value was obtained at θ=26°. Thus, this film proved to have a fixed nematic orientation, or tilt orientation, with a tilt angle of 26°.

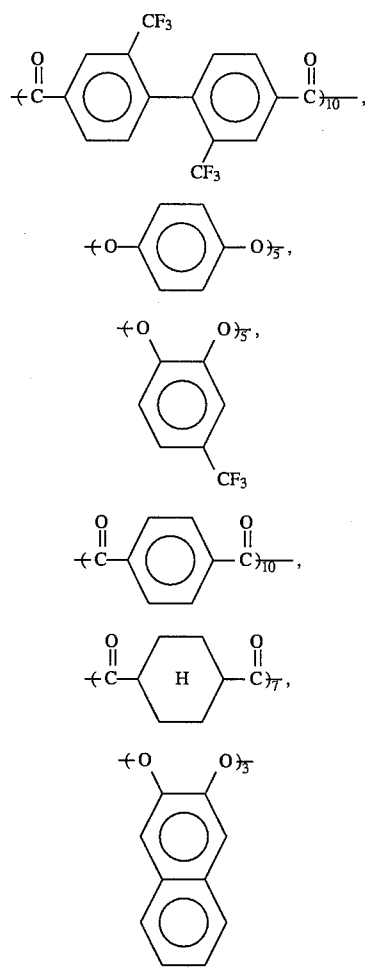

EXAMPLE 18

The polymer of formula (25) was prepared, which was a nematic liquid crystalline polymer having an η$_{inh}$ of 0.31 and vitrifying at a Tg of 96° C. Separately, the polymer of formula (26) was prepared, which was a crystalline polymer exhibiting a nematic liquid crystallinity but not having a glass phase. Then, using a polymer mixture containing 70 wt % of the former and 30 wt % of the latter, there was prepared a 15 wt % solution in tetrachloroethane. This solution was applied onto a rubbed polyimide film by printing, then dried, heat-treated at 230° C. for 20 minutes and thereafter cooled to room temperature rapidly.

Then, using an adhesive, a 50 µm thick triacetyl cellulose film was laminated to the liquid crystal layer side of the film, and after curing of the adhesive, the polyimide film was peeled off slowly, allowing the liquid crystal layer to be transferred onto the triacetyl cellulose film.

Next, the value of retardation was measured while tilting the thus-fabricated film in the manner described in Example 10; as a result, a maximum value was obtained at θ=24°. Thus, this film proved to have a nematic orientation, or tilt orientation, with a tilt angle of 24°.

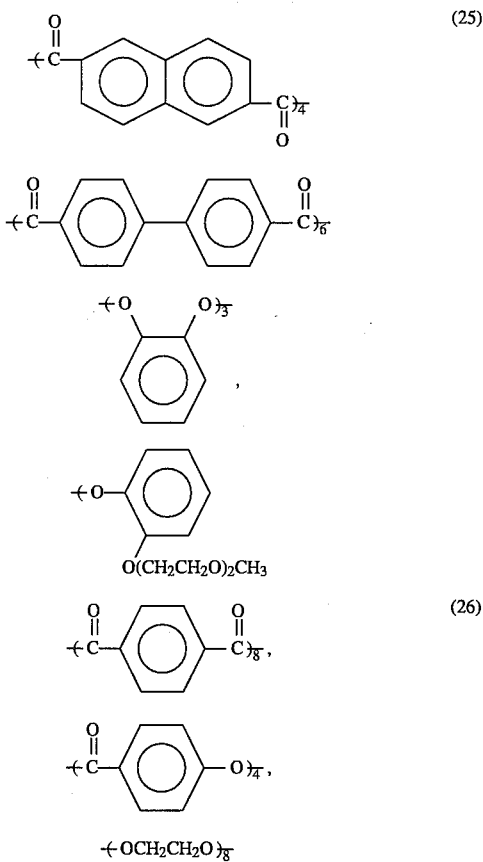

EXAMPLE 19

Using 98 mmol of terephthalic acid, 2 mmol of (S)-3-methyladipic acid, 50 mmol of hydroquinone diacetate, 50 mmol of t-butylcatechol diacetate and sodium acetate as catalyst, polymerization was performed in a nitrogen atmosphere at 280° C. for 2 hours and at 300° C. for 2 hours to prepare the polymer of formula (27). The polymer was then dissolved in tetrachloroethane and subsequent reprecipitation with methanol afforded a purified polymer. Inherent viscosity of the polymer was 0.25 and Tg 107° C. As a result of DEC and observation using a polarizing microscope, the polymer was found to have a glass phase, not having a crystal phase, in a lower temperature portion than the liquid crystal phase.

Using this polyester, there was prepared a 10 wt % solution in tetrachloroethane. This solution was applied onto a glass substrate having a rubbed polyimide film, by spin coating, then dried, heat-treated at 220° C. for 30 minutes and thereafter cooled to room temperature to give a uniformly oriented liquid crystal film having a thickness of 6.4

μm.

This sample was held in parallel between two polarizing plates disposed in a cross configuration in which their transmission axes are at right angle and observed. As a result, no matter how the sample was rotated around the intersecting axes with respect to a plane, there was not obtained a dark field, thus proving that this liquid crystal film was in a state of twisted orientation.

Next, a linearly polarized light was directed perpendicularly to the sample and the transmitted light was subjected to polarization analysis using an ellipsometer to determine a twist angle and retardation of the sample. Further, a twist angle of the sample was determined on the basis of incidence angle dependency of the state of polarization of transmitted light upon incidence of a linearly polarized light obliquely on the sample and incidence angle dependency of transmitted polarization spectrum in this state. As a result, twist angle and tilt angle were 144° and 25°, respectively, and thus it turned out that the liquid crystal film obtained in this Examples was in a state of twisted tilt orientation.

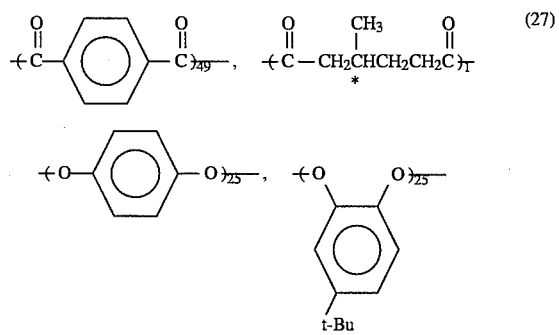
(27)

COMPARATIVE EXAMPLE 4

The polymer of formula (28) was prepared in the same way as in Example 19 except that (S)-3-methyladipic acid was substituted by 3-methyladipic acid as a racemate and t-butylcatechol diacetate was substituted by catechol diacetate. The polymer was then dissolved in tetrachloroethane and subsequent recprecipitation with methanol afforded a purified polymer. This polymer had an inherent viscosity of 0.23 and a Tg of 104° C. As a result of DSC and observation using a polarizing microscope, the polymer proved to have a glass phase, not having a crystal phase, in a lower temperature portion than the liquid crystal phase. Using this polymer and in the same manner as in Example 19 there was prepared a 6.5 μm thick liquid crystal film on a glass substrate having a rubbed polyimide film.

This sample was then measured for twist angle and tilt angle in the same way as in Example 19 to find that they were 0° and 1.5°, respectively In this sample, twist was not introduced because the polymer used did not have optical activity, and tilt orientation was not induced because t-butylcatechol unit was not used.

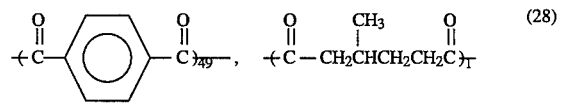
(28)

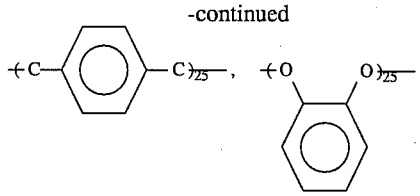
-continued

EXAMPLE 20

The polymer of formula (29) was prepared using (S)-2-methyl-1,4-butanediol as an optically active unit and in accordance with the method described in Example 19. The polymer had an inherent viscosity of 0.18 and a Tg of 95° C. As a result of DSC and observation using a polarizing microscope, the polymer was found to have a glass phase, not having a crystal phase, in a lower temperature portion than the liquid crystal phase. Using this polymer and in the same manner as in Example 19, a 5.0 μm thick liquid crystal film was formed on a 75 μm thick polyacrylate film having a rubbed polyimide film.

The thus-fabricated film was held in parallel between two polarizing plates disposed in a cross configuration in which their transmission axes are at right angle and observed. As a result, no matter how the sample was rotated around the intersecting axes with respect to a plane, there was not obtained a dark field, thus proving that this liquid crystal film was in a state of twisted orientation.

Then, this sample was measured for twist angle and tilt angle in accordance with the method described in Example 19, which were found to be 180° and 21°, respectively. It turned out that the liquid crystal film obtained in this Example was in a state of twisted tilt orientation.

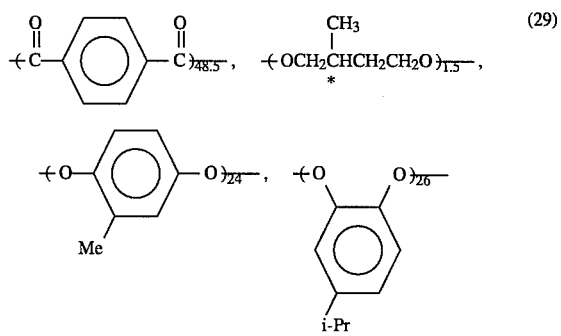
(29)

EXAMPLE 21

There were prepared the polymers of formulae (30) and (31) and the polymer of formula (32) which was an optically active polymer. These polymers had inherent viscosities of 0.22, 0.25 and 0.18, respectively. The polymers of formulae (30) and (31) were vitrifying polymers. Using a polymer mixture containing 20%, 79% and 1% by weight of the polymers (30), (31) and (32), respectively, there was prepared a 15 wt % solution in a mixed phenol/tetrachloroethane (60/40 weight ratio) solvent. This solution was applied onto a 75 μm thick polyacrylate film having a rubbed polyimide film by means of a spin coater, then dried, heat-treated at 250° C. for 30 minutes and further heat-treated at 210° C. for 20 minutes to give a liquid crystal film having a thickaness of 7.3 μm.

The thus-fabricated film was held in parallel between two polarizing plates disposed in a cross configuration in which their transmission axes are at right angle and observed. As a result, no matter how the sample was rotated around the intersecting axes with respect to a plane, there was not obtained a dark field. It turned out that this liquid crystal film was in a state of twisted orientation.

The film was then measured for twist angle and tilt angle in accordance with the method described in Example 19 to find that they were 85° and 30°, respectively, thus proving that the liquid crystal film obtained in this Example was in a state of twisted tilt orientation.

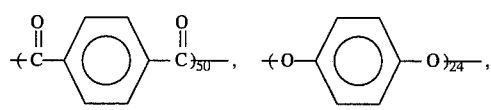           (30)

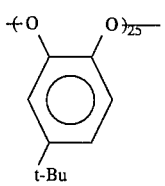

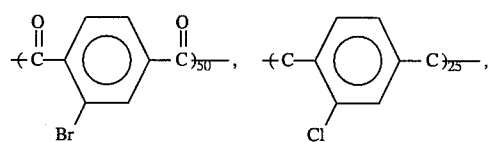           (31)

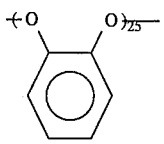

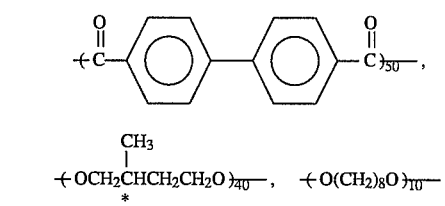           (32)

$+OCH_2\overset{*}{C}HCH_2CH_2O\}_{40}$—, $+O(CH_2)_8O\}_{10}$—

COMPARATIVE EXAMPLE 5

A liquid crystal film was produced in the same way as in Example 21 except that the polymer of formula (30) was substituted by the polymer (inherent viscosity: 0.19) of formula (33). When this film was measured for twist angle and tilt angle, there was obtained a twist angle value of 115°, proving that twist was introduced in the film, while the tilt angle obtained was 1.3°, indicating that there was no tilt orientation.

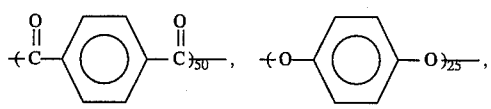           (33)

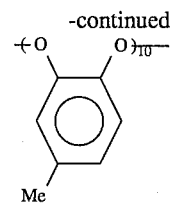
-continued

EXAMPLE 22

There were prepared the polymers of formulae (34) and (35) and the polymer of formula (36) which was an optically active polymer. These polymers had inherent viscosities of 0.20, 0.19 and 0.12, respectively. The polymers of formulae (32) and (35) were vitrifying polymers. Using a polymer mixture containing 50%, 49% and 1% by weight of the polymers (34), (35) and (36), respectively, there was prepared a 15 wt % solution in a mixed phenol/tetrachloroethane (60/40 weight ratio) solvent. This solution was applied onto a 75 μm thick polyether sulfone film having a rubbed polyimide film by means of a spin coated, then dried, heat-treated at 250° C. for 30 minutes and further heat-treated at 210° C. for 30 minutes to give a 3.0 μm thick liquid crystal film.

The thus-fabricated film was held in parallel between two polarizing plates disposed in a cross configuration in which their transmission axes are at right angle and observed. As a result, no matter how the sample was rotated around the intersecting axes with respect to a plane, there was not obtained a dark field. Thus, it turned out that this liquid crystal film was in a state of twisted orientation.

Next, the film was measured for twist angle and tilt angle in accordance with the method described in Example 19 to find that they were 43° and 35°, respectively. Thus, the liquid crystal film obtained in this Example proved to have a twisted tilt orientation.

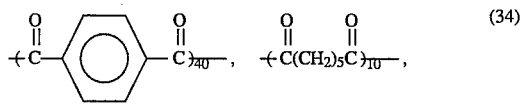           (34)

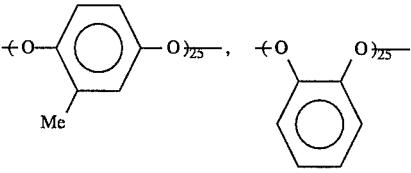

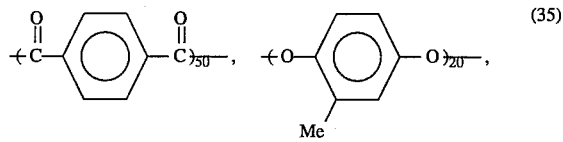           (35)

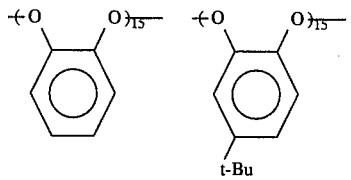

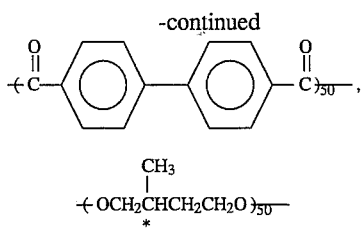

(36)

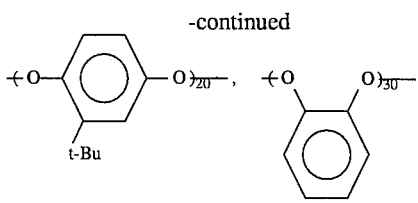

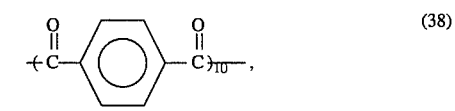

(38)

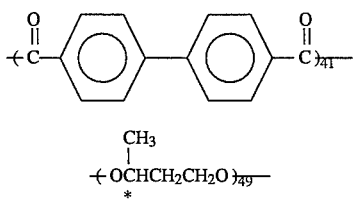

EXAMPLE 23

Using a mixture containing the polymers of formulae (34), (35) and (36) at a ratio (weight ratio) of 50:48:2, there was prepared a 15 wt % solution in N-methylpyrrolidone. This solution was applied onto a 100 μm thick polyphenylene sulfide film having a rubbed surface by means of a spin coater, then dried, heat-treated at 250° C. for 30 minutes and further heat-treated at 210° C. for 30 minutes to afford a 8.4 μm thick liquid crystal film. To the liquid crystal polymer side of this film was then laminated a 50 μm thick polyester sulfone film through an optical adhesive, namely, an adhesive for optical use. After curing of the adhesive, the polyphenylene sulfide film was peeled off at the interface with the liquid crystal polymer, allowing the liquid crystal polymer layer to be transferred to the polyether sulfone film side.

The film thus fabricated was held in parallel between two polarizing plates disposed in a cross configuration in which their transmission axes are at right angle and observed. As a result, no matter how the sample was rotated around the intersecting axes with respect to a plane, there was not obtained a dark field, proving that this liquid crystal film was in the state of a twisted orientation.

Then, the film was measured for twist angle and tilt angle in accordance with the method described in Example 19 to find that they were 240° and 35°, respectively. Thus, the liquid crystal film obtained in this example was found to have a twisted tilt orientation.

EXAMPLE 24

The polymers of formulae (37) and (38) were prepared. The polymer of formula (37) was a vitrifying polymer having an inherent viscosity of 0.30, while the polymer of formula (38) was a polymer having an inherent viscosity of 0.30 and having a crystal layer.

Using a polymer mixture containing 90 wt % of the polymer (37) and 10 wt % of the polymer (38), there was prepared a 15 wt % solution in N-methylpyrrolidone. Then, using this solution, a laminate film having a liquid crystal layer thickness of 4.6 μm was fabricated in the same way as in Example 19. The film was measured for twist angle and tilt angle in accordance with the method described in Example 19 to find that they were 230° and 26°, respectively. Thus, this liquid crystal film proved to have a twisted tilt orientation,

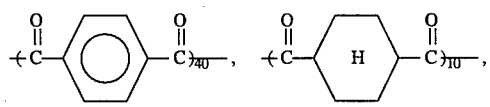

(37)

EXAMPLE 25

There were prepared the polymers of formulae (39) and (40) and the polymer of formula (41) which was an opticlly active polymer. The polymer (39) was a polymer having an inherent viscosity of 0.21 and having a crystal phase, the polymer (40) was a vitrifying polymer having an inherent viscosity of 0.22, and the polymer (41) was a polymer having an inherent viscosity of 0.18 and having a crystal phase. Using a polymer mixture containing the polymers (39), (40) and (41) at a weight ratio of 8:91:1, there was prepared a 10 wt % solution in a mixed phenol/tetrachloroethane (60/40 weight ratio) solvent. This solution was applied onto a 125 μm thick polyimide film having a rubbed surface by means of a roll coater, then dried, heat-treated at 250° C. for 60 minutes and thereafter cooled to give a 7.7 μm thick liquid crystal film. Then, an optical adhesive was applied to the liquid crystal polymer side of this film, to which was then laminated a 50 μm thick polyether sulfone film. After curing of the adhesive, the polyimide film was peeled off at the interface with the liquid crystal polymer layer, allowing the liquid crystal polymer layer to be transferred to the polyether sulfone film side.

The thus-fabricated film was measured for twist angle and tilt angle in accordance with the method described in Example 19 to find that they were 130° and 31°, respectively. Thus, it turned out that this liquid crystal film had a twisted tilt orientation.

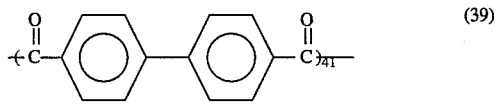

(39)

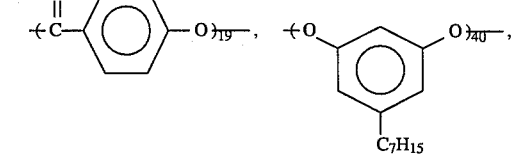

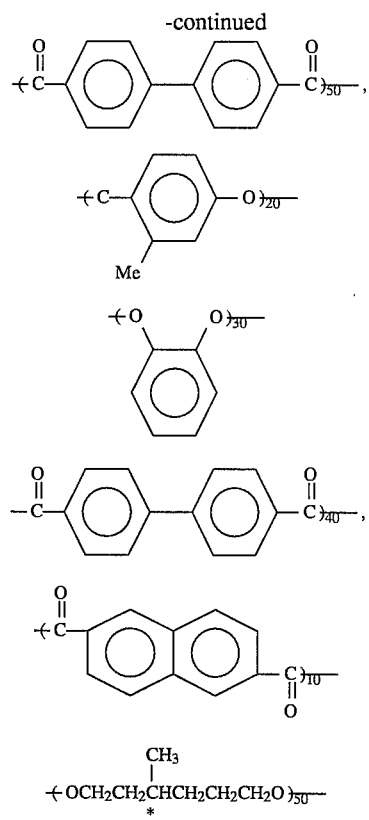

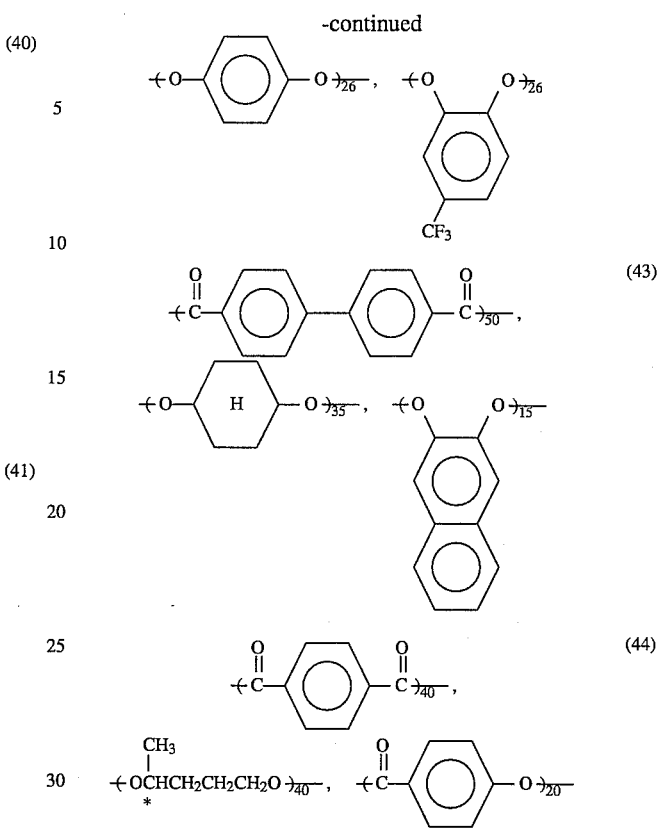

EXAMPLE 26

There were prepared the polymers of formulae (42) and (43) and the polymer of formula (44) which was an optically active polymer. The polymer (42) was a vitrifying polymer having an inherent viscosity of 0.20, the polymer (43) was also a vitrifying polymer having an inherent viscosity of 0.12, and the polymer (44) was a polymer having an inherent viscosity of 0.13 and having a crystal phase. Using a polymer mixture containing the polymer (42), (43) and (44) at a weight ratio of 50:45:5, there was prepared a 10 wt % solution in a mixed phenol/tetrachloroethane (60/40 weight ratio) solvent. This solution was applied onto a glass substrate having a rubbed polyimide film 125 μm thick by means of a spin coater, then dried, heat-treated at 230° C. for 60 minutes and thereafter cooled to afford a liquid crystal film having a thickness of 1.5 μm.

This sample was measured for twist angle and tilt angle in accordance with the method described in Example 19 to find that they were 78° and 12°, respectively. Thus, it turned out that this liquid crystal film had a twisted tilt orientation.

EXAMPLE 27

There were prepared the polymer or formula (45) and the polymer of formula (46) which was an optically active polymer. The polymer (45) was a vitrifying polymer having an inherent viscosity of 0.31, while the polymer (46) was a polymer having an inherent viscosity of 0.22 and having a crystal phase. Using a polymer mixture containing the polymers (45) and (46) at a weight ratio of 90:10, there was prepared a 10 wt % solution in phenol/tetrachloroethane (60/40 weight ratio). This solution was applied onto a 75 μm thick polyacrylate film having a rubbed polyimide film by means of a spin coater, then dried, heat-treated at 210° C. for 30 minutes and thereafter cooled to afford a liquid crystal film having a thickness of 3.4 μm.

This sample was then measured for twist angle and tilt angle in the manner described in Example 19 to find that they were 70° and 23°, respectively. Thus, it turned out that this liquid crystal film had a twisted tilt orientation.

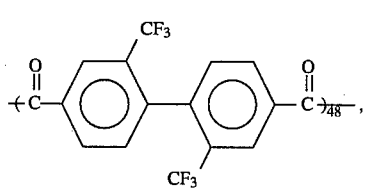

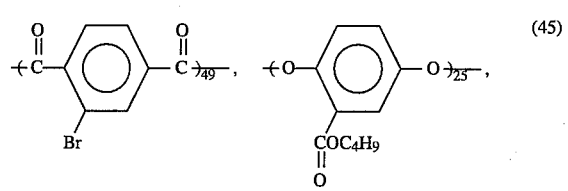

-continued

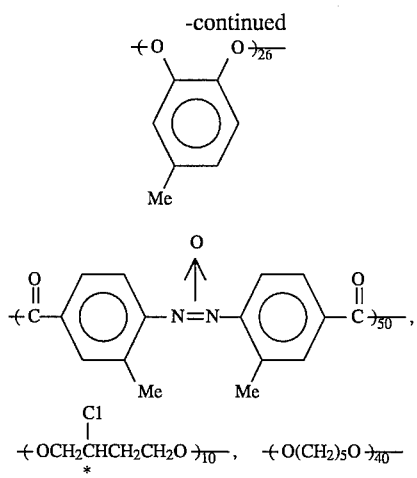
(46)

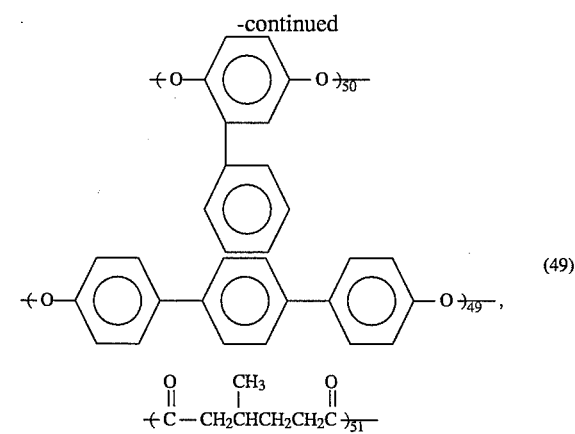
(49)

EXAMPLE 28

The polymers of formulae (47) and (48) and the polymer of formula (49) as an optically active polymer were prepared. The polymer (47) was a polymer having an inherent viscosi ty of 0.25 and having a crystal phase, the polymer (48) was a vitrifying polymer having an inherent viscosity of 0.22, a nd the polymer (49) was a polymer having an inherent viscosi ty of 0.20. Using a polymer mixture containing the polymers (47), (48) and (49) at a weight ratio of 20:77:3, there was prepared a 15 wt % solution in tetrachloroethane. This solution was applied onto a 125 μm thick polyimide film by means of a roll coater, then dried, heat- treated at 250° C. f or 60 minutes, thereafter cooled slowly to 200° C. and then co oled to room temperature to afford a liquid crystal film hav ing a thickness of 5.9 μm. Next, an optical adhesive was applied to the liquid crystal polymer side of the film, to w hich was then laminated a 75 μm thick triacetyl cellulose film. After curing of the adhesive, the polyimide film was peeled off at the interface with the liquid crystal polymer layer, allowing the liquid crystal polymer layer to be trans ferred onto the triacetyl cellulose side.

The thus-fabricated film was measured for twist angle a nd tilt angle in the manner described in Example 19 to find that they were 69° and 32°, respectively. Thus, it turned out that this liquid crystal film had a twisted tilt orient ation.

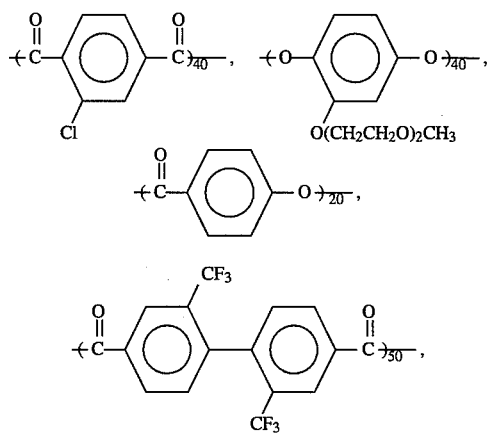

EXAMPLE 29

Using a mixture containing a polymer A1 ($\eta_{inh}$=0.21), a polymer A2 ($\eta_{inh}$=0.20) and an optically active polymer A3 ($\eta_{inh}$=0.11) at a weight ratio of 93.5:5.0:1.5, there was prepared a 15 wt % solution in phenol/tetrachloroet hane. This solution was applied onto a glass substrate 10 cm square having a thickness of 1.1 mm and having a rubbed polyimide film by spin coating, followed by drying of the substrate over a hot plate and subsequent heat treatment in an air thermostable bath at 230° C. for 5 minutes to obtain a compensator A. This compensator was found to have the parameters of retardation 838 nm, tilt angle 4° and twist angle −228°.

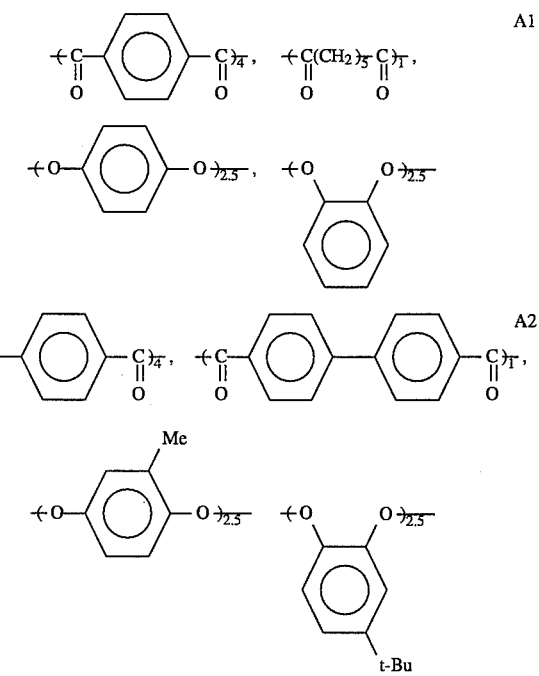

Me : Methyl
t-Bu : tert-Butyl

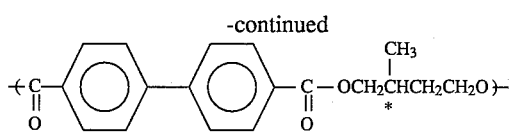

A3

COMPARATIVE EXAMPLE 6

Using a polymer mixture containing a polymer B1 ($\eta_{inh}=$ 0.22) and an optically active polymer B2 $\eta_{inh}=0.14$) at a weight ratio of 97.0:3.0, there was prepared a 15 wt % solution in phenol/tetrachloroethane. This solution was applied onto a glass substrate of 10 cm square having a thickness of 1.1 mm and having a rubbed polyimide film, followed by drying of the solvent over a hot plate and subsequent heat treatment in an air thermostable bath at 230° C. for 5 minutes to obtain a compensator B having the parameters of retardation 840 nm, tilt angle 0° and twist angle −230°.

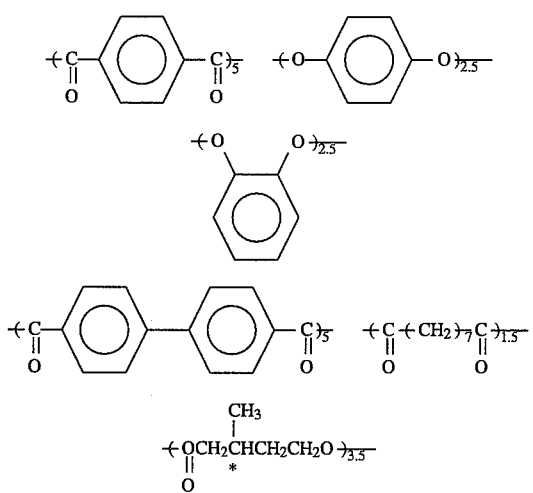

EXAMPLE 30

Figure 6:
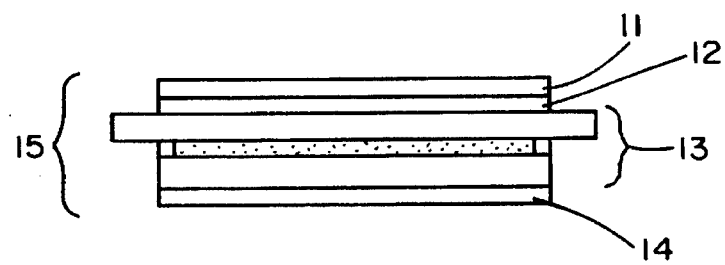
FIG. 6 is a sectional view of the liquid crystal cell used in the examples.

In accordance with the arrangement shown in FIG. 6, the compensators A and B were, respectively, attached on the upper surface of an STN cell of 1/200 duty drive having a twist angle of 230° C. and a retardation of 840 nm and a polarizing plate was attached thereon.

Figure 7:
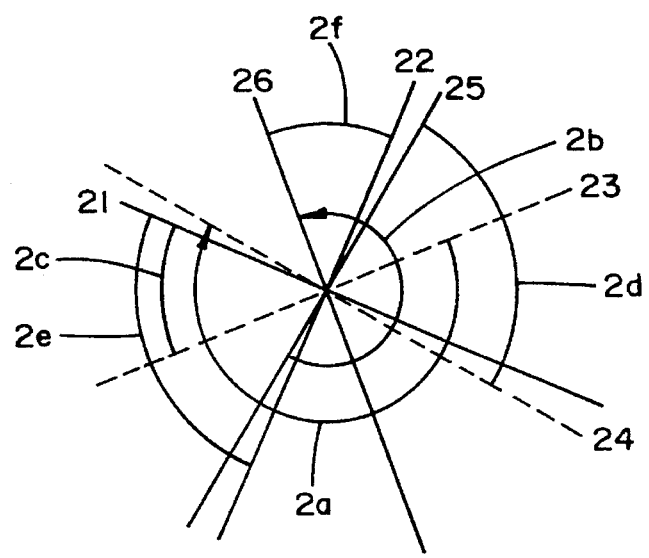
FIG. 7 is an explanative view of the optical axis of each material constituting the liquid crystal cell used in the examples.

The direction of the upper polarizing plate and that of the lower polarizing plate, the rubbing direction of the upper electrode substrate and that of the lower electrode substrate, and the molecular orienting direction in the compensation layer are as shown in FIG. 7. The angle between the polarization axis of the upper polarizing plate and that of the lower polarizing plate is 90°, the angle between the direction of the lower polarizing plate and the rubbing direction of the lower electrode substrae is 45°, and the angle between the rubbing direction of the upper electrode substrate and the molecular orientation direction of the surface of the compensation layer in contact with the upper electrode substrate is 90°.

Figure 8:
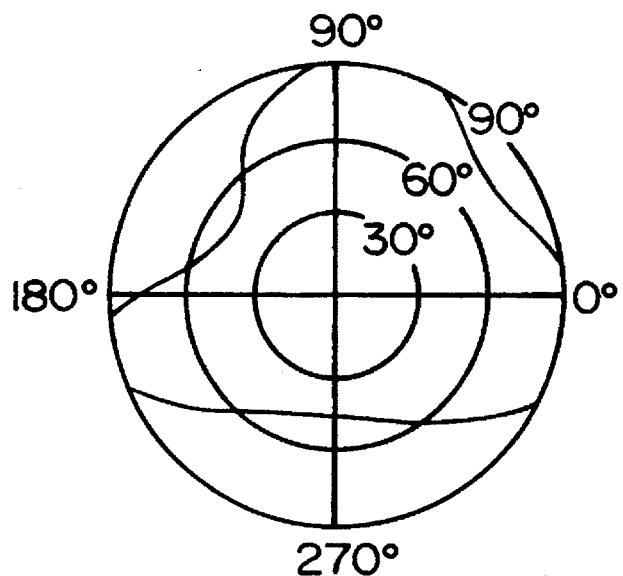
FIG. 8 is an equicontrast curve showing the area of contrast 1 when the compensator A was used in Example 30.
Figure 9:
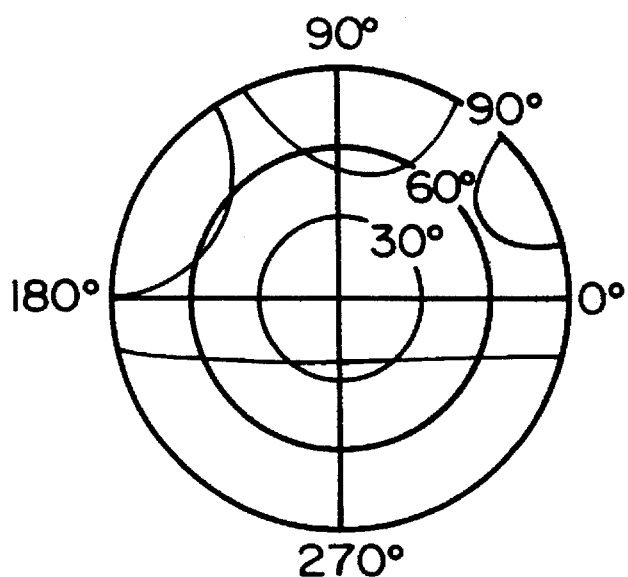
FIG. 9 is an equicontrast curve showing the area of contrast 1 when the compensator B was used in Example 30.

When viewed from the front, colorless sufficient black and white display was obtained in the both cases of the compensators A and B. But the area inside the contrast 1 in the case of the compensator B where the tilt angle was 0° as shown in FIG. 9, i.e. the area where black-and-white is not inverted was remarkedly narrower than that in the case where the compensator A having a tilt angle as shown in FIG. 8.

That is, the viewing angle characteristics of the compensator A was markedly improved in comparison with the compensator B.

EXAMPLE 31

Figure 10:
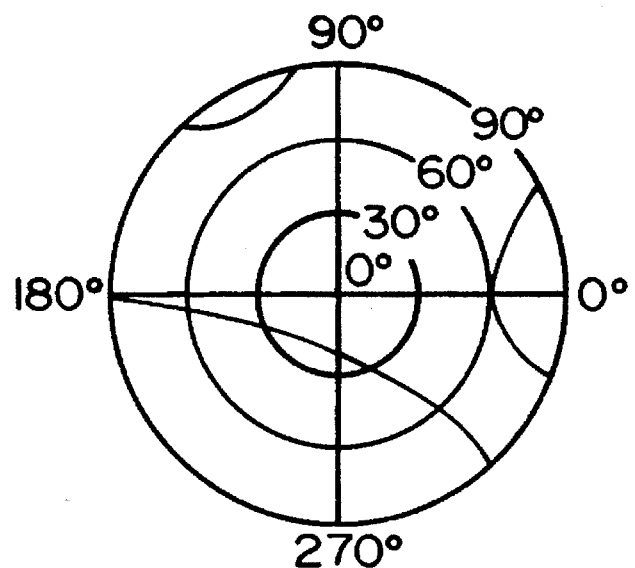
FIG. 10 is an equicontrast curve showing the area of contrast 1 when the compensator C was used in Example 31.

Using a polymer mixture containing a polymer C1 ($\eta_{inh}=$ 0.16), a polymer C2 ($\eta_{inh}=0.18$) and an optically active polymer C3 ($\eta_{inh}=0.16$) at a weight ratio of 87.3:9.7:3.0, there was prepared a 20 wt % wolution in N-methylpyrrolidone. This solution was applied onto a glass substrate of 10 cm square having a thickness of 1.1 mm and having a rubbed polyimide film by spin coating. Then, the solvent was dried over a hot plate, follwed by heat treatment in an air thermostable bath at 220° C. for 10 minutes to obtain a compensator C having the parameters of retardation 838 nm, tilt angle 12 and twist angle −230°. Using the compensator C, there was fabricated a test cell in the same way as in Example 30. As a result, there was obtained a satisfactory black-and-white display, and the non-inverted area of black-and-white display inside the contrast 1 was expanded in comparison with the compensator B as shown in FIG. 10.

EXAMPLE 32

Figure 11:
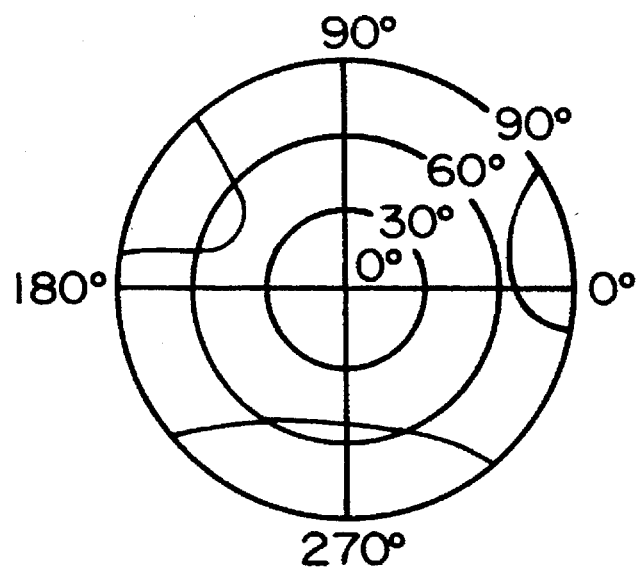
FIG. 11 is an equicontrast curve showing the area of contrast 1 when the compensator C' was used in Example 32.

A compensator C' was fabricated in the same way as in Example 31 except that the ratio of the polymers C1, C2 and C3 was changed to 92.2:4.9:3.0. The compensator C' had the parameters of retardation 835 nm, tilt angle 5° and twist angle −228°. Using the compensator C', a test cell was fabricated in the same manner as in Example 30. As a result, there was obtained a satisfactory black-and-white display, and the non-inverted area of black-and-white display inside the contrast 1 was expanded in comparison with the compensator B as shown in FIG. 11.

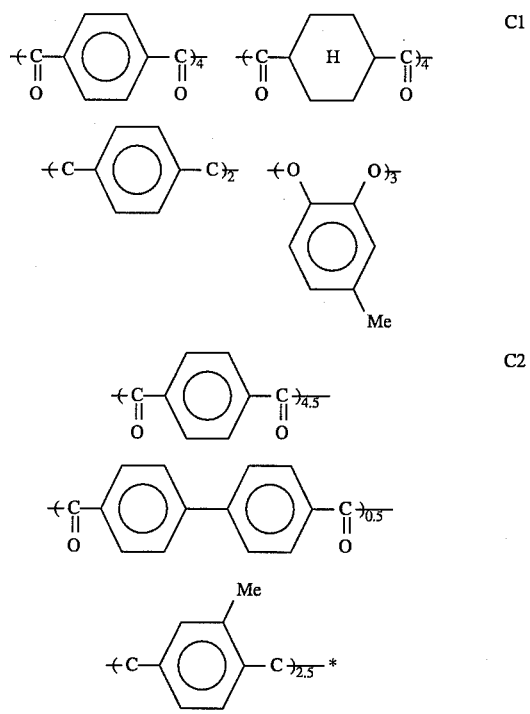

-continued

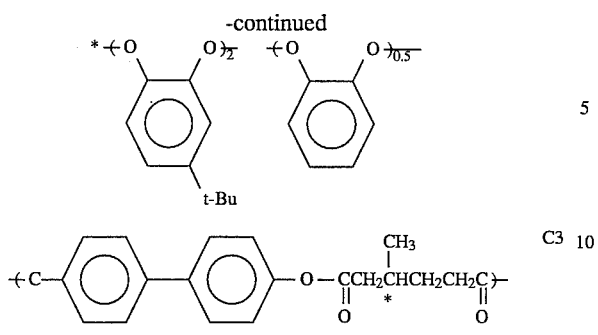

C3

-continued

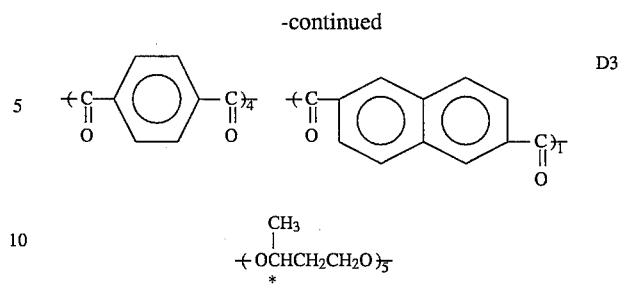

D3

EXAMPLE 33

Using a polymer mixture containing a polymer D1 ($\eta_{inh}$=0.13), a polymer D2 ($\eta_{inh}$=0.14) and an optically active polymer D3 ($\eta_{inh}$=0.09) at a weight ratio of 70.0:28.0:2.0, there was prepared an 18 wt % solution in a mixed p-chlorophenol/tetrachloroethane (80/20 weight ratio) solvent. This solution was applied by curtain coating onto a polyimide film whose surface had been rubbed directly. Then, the solvent was dried in an oven, followed by heat treatment in air thermostable bath at 210° C. for 30 minutes.

Then, a 75 μm thick polyether sulfone film was laminated to the liquid crystal polymer side of the film through an optical adhesive. After curing of the adhesive, the polyimide film was peeled off slowly at the interface with the liquid crystal layer, allowing the liquid crystal layer to be transferred to the polyether sulfone film side. In this way there was fabricated a compensator D having the parameters of retardation 703 nm, tilt angle 18° and twist angle −138°. Using the compensator D, a test cell was formed in the same manner as in Example 30. As a result, there was obtained a satisfactory black-and-white display, and the non-inverted area of black-and-white display inside the contrast 1 at the equicontrast curve was expanded in 90° direction as compared with the compensator B.

EXAMPLE 34

There was prepared a 12 wt % solution of a polymer E ($\eta_{inh}$=0.20) in tetrachloroethane. This solution was applied by spin coating onto a 75 μm thick polyether ether ketone film whose surface had been rubbed directly. Then, the solvent was dried in an oven, followed by heat treatment in an air thermostable bath at 230° C. for 20 minutes. Next, a 25 μm thick triacetyl cellulose film was laminated to the liquid crystal polymer side of the film through an optical adhesive. After curing of the adhesive by the radiation of ultraviolet light, the polyether ether ketone film was peeled off slowly at the interface with the liquid crystal layer, allowing the liquid crystal layer to be transferred to the triacetyl cellulose film side. In this way there was produced a compensator E having the parameters of retardation 710 nm, tilt angle 22° and twist angle −141°.

Using the compensator E, a test cell was fabricated in the same manner as in Example 30. As a result, there was obtained a satisfactory black-and-white display, and the non-inverted area of black-and-white display inside the contrast 1 at the equicontrast curve was expanded in both 90° and 270° directions as compared with the compensator B.

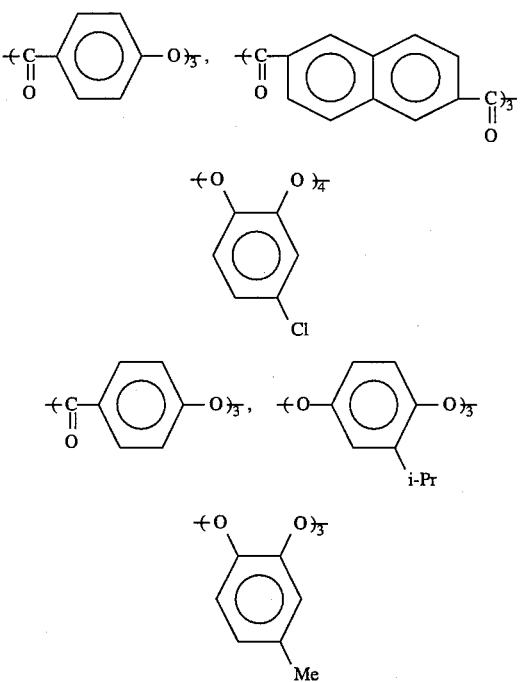

D1

D2

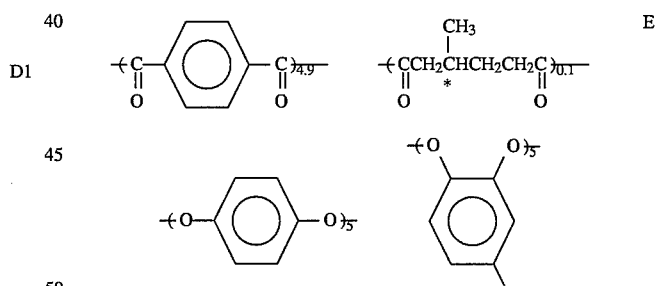

E

EXAMPLE 35

There was prepared a 15 wt % solution of a polymer F ($\eta_{inh}$=0.12) in tetrachloroethane. This solution was applied by spin coating onto a 75 μm thick polyphenylene sulfide film whose surface had been rubbed directly. Then, the solvent was dired in an oven, followed by heat treatment in an air thermostable bath at 220° C. for 30 minutes. Subsequently, a 25 μm thick triacetyl cellulose film was laminated to the liquid cystal polymer side of the film through an optical adhesive. After curing of the adhesive by the radiation of ultraviolet light, the polyphenylene sulfide film was peeled off at the interface with the liquid crystal layer, allowing the liquid crystal layer to be transferred to the triacetyl cellulose film side. In this waythere was produced a compensator F having the parameters of retardation 838 nm, tilt angle 13° and twist angle −233°.

Using the compensator F, a test cell was fabricated in the same manner as in Example 30. As a result, there was obtained a satisfactory black-and-white display, and the non-inverted area of black-and-white display inside the contrast 1 at the equicontrast curve was expanded in all directions as compared with the compensator B.

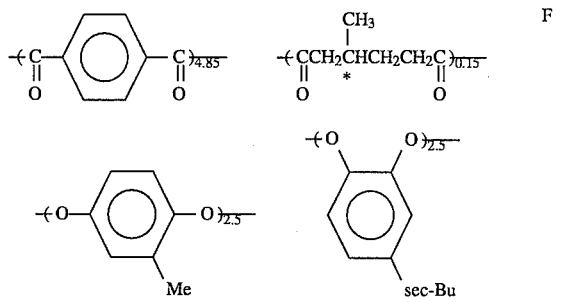

F

EXAMPLE 36

Using a polymer mixture containing a polymer G1 ($\eta_{inh}$=0.21) a polymer G2 ($\eta_{inh}$=0.22) and an optically active polymer G3 ($\eta_{inh}$=0.18) at a weight ratio of 2.0:96.0:2.0, there was prepared a 15 wt % solution in a mixed p-chlorophenol/tetrachloroethane (80/20 weight ratio) solvent.

This solution was applied by curtain coating onto a polyimide film whose surface had been rubbed directly. Then, the solvent was dried in an oven, followed by heat treatment in an air thermostable bath at 210° C. for 30 minutes. Subsequently, a 50 μm thick polyacrylate film was laminated to the liquid crystal polymer side of the film through an optical adhesive. After curing of the adhesive, the polyimide film was peeled off slowly at the interface with the liquid crystal polymer layer, allowing the liquid crystal layer to be transferred to the polyacrylate film side. In this way there was obtained a compensator G having the parameters of retardation 835 nm, tilt angle 10° and twist angle −145°.

Using the compensator G, a test cell was fabricated in the same manner as in Example 30. As a result, there was obtained a satisfactory black-and-white display, and the non-inverted area of black-and-white display inside the contrast 1 at the equicontrast curve was expanded in 90° direction as compared with the compensator B.

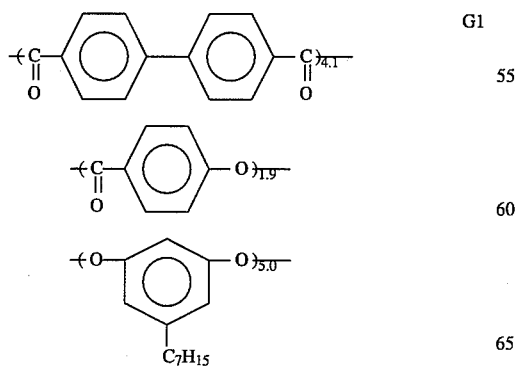

G1

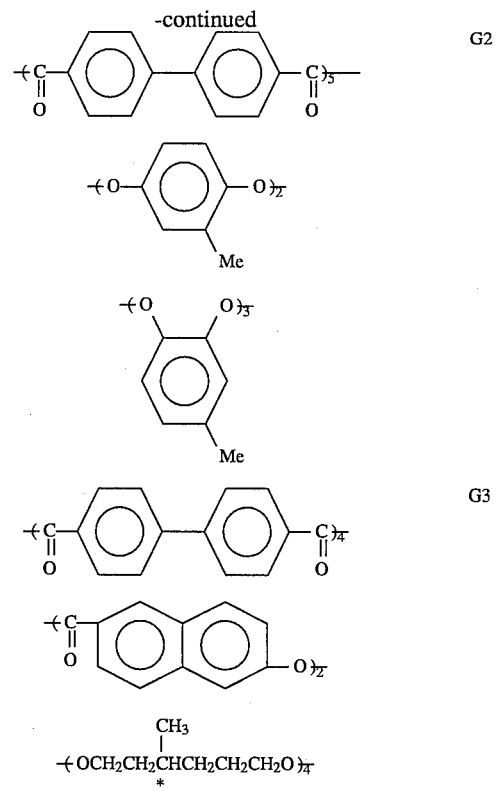

G2

G3

EXAMPLE 37

Using a polymer mixture containing a polymer H1 ($\eta_{inh}$=0.10), a polymer H2 ($\eta_{inh}$=0.12) and an optically active polymer H3 ($\eta_{inh}$=0.12) at a weight ratio of 45.0:45.0:10.0, there was prepared a 20 wt % solution in tetrachloroethane. This solution was applied by curtain coating onto a polyimide film whose surface had been rubbed directly. Then, the solvent was dried in an oven, followed by heat treatment in an air thermostable bath at 200° C. for 30 minutes. Subsequently, a 50 μm thick polyacrylate film was laminated to the liquid crystal polymer side of the film through an optical adhesive. After curing of the adhesive, the polyimide film was peeled off slowly at the interface with the liquid crystal layer, allowing the liquid crystal layer to be transferred to the polyacrylate film side. In this way there was obtained a compensator H having the parameters of 840 nm, tilt angle 12°, twist angle −230°.

Using the compensator H, a test cell was fabricated in the same manner as in Example 30. As a result, there was obtained a satisfactory black-and-white display, and the non-inverted area of black-and-white display inside the contrast 1 at the equicontrast curve was expanded in comparison with the compensator B.

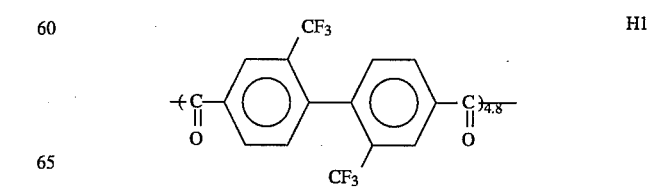

H1

-continued

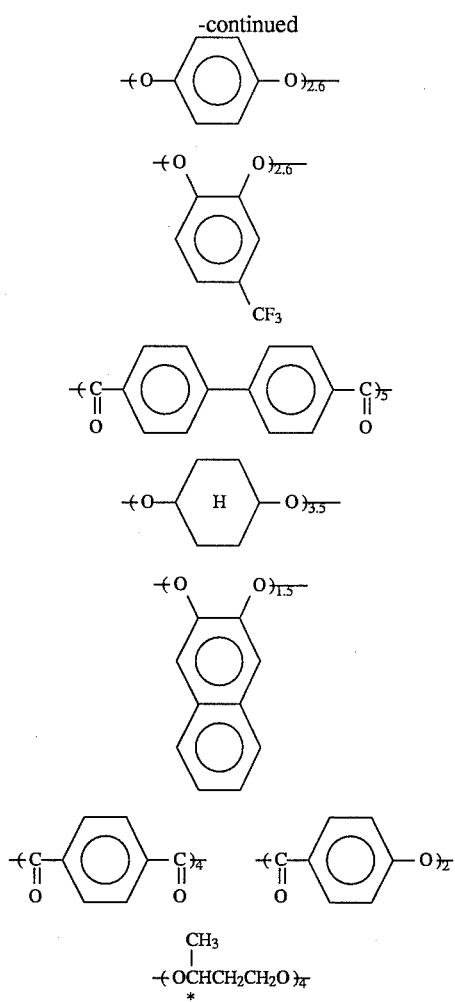

EXAMPLE 38

Using a polymer mixture containing a polymer 11 (η inh=0.31) and a polymer 12 ($\eta_{inh}$=0.23) at a weight ratio of 80.0:20.0, there was prepared a 20 wt % solution in tetrachloroethane. This solution was applied by curtain coating onto a polyimide film whose surface had been rubbed directly. Then, the solvent was dried in an oven, followed by heat treatment in an air thermostable bath at 190° C. for 20 minutes. Thereafter, a 50 μm thick polyarylate film was laminated to the liquid crystal polymer side through an optical adhesive. After curing of the adhesive, the polyimide film was peeled off slowly at the interface with the liquid crystal layer, allowing the liquid crystal layer to be transferred to the polyacrylate film side. In this way there was obtained a compensator I having the parameters of retardation 835 nm, tilt angle 18° and twist angle −235°.

Using the compensator I, a test cell was fabricated in the same manner as in Exmple 30. As a result, there was obtained a satisfactory black-and-white display, and the non-inverted area of black-and-white display inside the contrast 1 at the equicontrast curve was expanded particularly in 90° direction as compared with the compensator B.

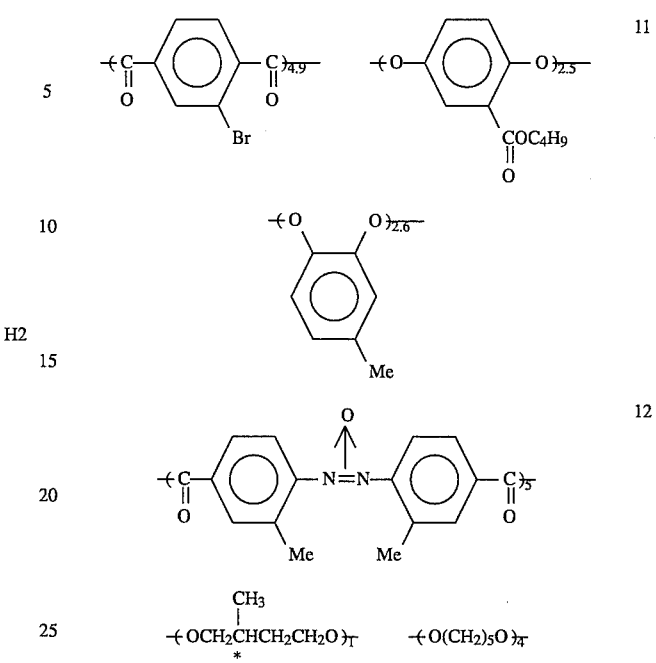

The reference numerals used in the drawings are as follows.

1 incident light, 2 upper polarizing plate, 3 liquid crystalline polymer film, 4 lower polarizing plate, 5 outgoing light, 6 spectrophotometer (retardation measurement device), 7 transmitting axis of upper polarizing plate, 8 the rubbing axis direction of trhe substrate for liquid crystalline polymer, 9 transmitting axis of lower polarizing plate, 11 upper polarizing plate, 12 compensator, 13 STN liquid crystal cell, 14 lower polarizing plate, 21 transmitting axis of lower polarizing plate, 22 transmitting axis of upper polarizing plate, 23 rubbing axis of lower electrode substrate, 24 rubbing axis of upper electrode substrate, 25 molecular orientation direction in the face at upper electrode substrate side of compensator, 26 molecule orientation direction of the face at upper polarizing plate side of compensator, 2a twist angle of liquid crystalline molecule in the liquid crystal cell, 2b twist angle of polymer liquid crystal of the compensator 2c angle between 21 and 23, 2d angle between 24 and 25, 2e angle between 21 and 22, and 2f angle between 22 and 2f.

What is claimed is:

1. A liquid crystalline polymer film comprising a film of a liquid crystalline polymeric composition, said composition including a liquid crystalline polymer having homeotropic orientation and a liquid crystalline polymer having homogeneous orientation, disposed on a substrate, said film having fixed twisted tilt orientation, said twisted tilt orientation being such that the angle between a director of said liquid crystalline polymeric composition and a plane of said substrate is in the range of 5 to 85 degrees in terms of an average value and that a projection of the director of the liquid crystalline polymeric composition on the substrate plane is rotated continuously in the thickness direction of the film.

2. A liquid crystalline polymer film as set forth in claim 1, wherein said liquid crystalline polymer is selected from the group consisting of polymers containing an optically active unit and liquid crystalline compositions containing an optically active compound.

3. A liquid crystalline polymer film as set forth in claim 1, wherein said substrate has a preferential pretilt direction.

4. A compensator for a liquid crystal display consisting essentially of a light transmitting substrate and a liquid crystalline polymer layers, said liquid crystalline polymer layer comprising a liquid crystalline polymeric composition, said composition including a liquid crystalline polymer having homeotropic orientation and a liquid crystalline polymer having homogeneous orientation, formed on said substrate, said liquid crystalline polymer having fixed orientation, said orientation of said liquid crystalline polymer layer comprising a tilt orientation or a twisted tilt orientation, said twisted tilt orientation being such that the angle between a director of said crystalline polymer and a plane of said substrate is in the range of 5 to 85 degrees in terms of an average value and that a projection of the director of the liquid crystalline polymeric composition on the substrate plane is rotated continuously in the thickness direction of the film.

* * * * *

UNITED STATES PATENT AND TRADEMARK OFFICE
CERTIFICATE OF CORRECTION

PATENT NO. : 5,460,748            Page 1 of 7
DATED     : October 24, 1995
INVENTOR(S): Hitoshi Mazaki, et al.

It is certified that error appears in the above-indentified patent and that said Letters Patent is hereby corrected as shown below:

```
Column 1, line 26:   "iquid"   should read --liquid--
Column 4, line 17:   "lyaer"   should read --layer--
Column 5, line 60:   before "dicarboxylic"  insert --"--
Column 5, line 64:   before " "hydroxycarboxylic " insert
--(--
Column 26, line 51:  "crysttalline"  should read
--crystalline--
Column 31, line 17:  "For"     should read --for--
Column 31, line 26:  "mete"    should read --meta--
Column 31, line 32:  after " (3) "  insert --)--
Column 37, line 41:  "methoky, ethoky"  should read
--methoxy, ethoxy--
Column 38, line 35,  "ethoxy,"  should read --methoxy--
Column 38, line 35:  "phemyl"   should read --phenyl--
Column 39, line 32:  "hologen"  should read --halogen--
```

UNITED STATES PATENT AND TRADEMARK OFFICE
CERTIFICATE OF CORRECTION

PATENT NO. : 5,460,748
DATED : October 24, 1995
INVENTOR(S) : Hitoshi Mazaki, et al.

It is certified that error appears in the above-indentified patent and that said Letters Patent is hereby corrected as shown below:

Column 47, lines 2-5: " 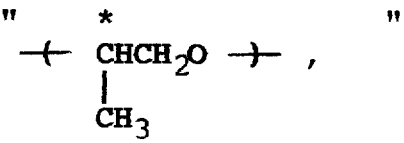 "

should read

-- 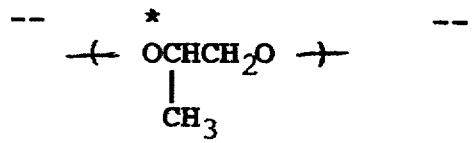 --

Column 47, line 39: "differes" should read --differs--

Column 47, line 42: "propert" should read --property--

Column 47, line 44: "20 wt" should read --40 wt--

Column 47, line 60: "conditionat a" should read --condition at--

Column 48, line 15: "limted" should read --limited--

UNITED STATES PATENT AND TRADEMARK OFFICE
CERTIFICATE OF CORRECTION

PATENT NO. : 5,460,748
DATED : October 24, 1995
INVENTOR(S) : Hitoshi Mazaki, et al.

It is certified that error appears in the above-indentified patent and that said Letters Patent is hereby corrected as shown below:

Column 48, line 19: "polylefin" should read --polyolefin--

Column 49, line 43: "colling" should read --cooling--

Column 51, line 9: "iullustration" should read --illustration--

Column 51, line 32: "briefringence" should read --birefringence--

Column 51, line 53: "tetrachloroethan e" should read --tetrachloroethane--

Column 52, line 43: "sampel" should read --sample--

Column 52, line 59: "dired" should read --dried--

Column 52, line 66: "homegeneous" should read --homogeneous--

Column 53, line 59: "ahomeotropic" should read --a homeotropic--

Column 53, line 61: "ahomogeneous" should read --a homogeneous--

UNITED STATES PATENT AND TRADEMARK OFFICE
CERTIFICATE OF CORRECTION

PATENT NO. : 5,460,748
DATED : October 25, 1995
INVENTOR(S) : Hitoshi Mazaki, et al.

It is certified that error appears in the above-indentified patent and that said Letters Patent is hereby corrected as shown below:

Column 54, line 42: "polymide" should read --polyimide--
Column 54, line 49: "A n" should read --△ n --
Column 56, line 29: "DEC" should read --DSC--
Column 61, line 43: "12" should read --14--
Column 62, line 66: "the" should read --then--
Column 64, lines 27-33: " 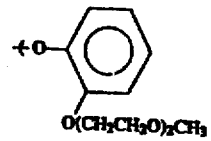 "

should read -- 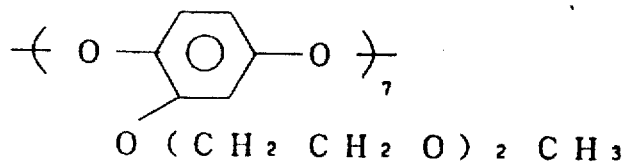 --

Column 64, line 58: "DEC" should read --DSC--

UNITED STATES PATENT AND TRADEMARK OFFICE
CERTIFICATE OF CORRECTION

PATENT NO. : 5,460,748  Page 5 of 7
DATED : October 24, 1995
INVENTOR(S) : Hitoshi Mazaki, et al.

It is certified that error appears in the above-indentified patent and that said Letters Patent is hereby corrected as shown below:

Column 65, line 21: "Examples" should read --Example--

Column 65, line 46: "recprecipitation" should read --reprecipitation--

Column 66, line 67: "thickaness" should read --thickness--

Column 68, line 18: "(32)" should read --(34)--.

Column 70, line 28: "opticlly" should read --optically--

Column 73, lines 27 & 31: "viscoti ty" should read --viscosity--. Col. 73, line 30: "0.22" should read --0.24--.

Column 73, line 30: "a nd" should read --and--

Column 73, line 36: "f or" should read --for--

Column 73, line 37: "co oled" should read --cooled--

Column 73, line 38: "hav ing" should read --having--

UNITED STATES PATENT AND TRADEMARK OFFICE
CERTIFICATE OF CORRECTION

PATENT NO. : 5,460,748
DATED : October 24, 1995
INVENTOR(S) : Hitoshi Mazaki, et al.

It is certified that error appears in the above-indentified patent and that said Letters Patent is hereby corrected as shown below:

Column 73, line 40: "w hich" should read --which--
    Column 73, line 44: "trans ferred" should read --transferred--
    Column 73, lines 45-46: "a nd" should read --and--
    Column 73, line 48: "orient ation" should read --orientation--
    Column 74, line 27: "phenol/tetrachloroet hane" should read --phenol/tetrachloroethane--
    Column 74, line 28: after "substrate" insert --of--
    Column 75, line 11: "B2 $n_{inh}$=0.14)" should read --B2 ($n_{inh}$=0.14)--
    Column 75, line 58: "substrae" should read --substrate--
    Column 76, line 13: "wolution" should read --solution--
    Column 78, line 59: "dired" should read --dried--

UNITED STATES PATENT AND TRADEMARK OFFICE
CERTIFICATE OF CORRECTION

PATENT NO. : 5,460,748
DATED : October 24, 1995
INVENTOR(S) : Hitoshi Mazaki, et al.

It is certified that error appears in the above-indentified patent and that said Letters Patent is hereby corrected as shown below:

Column 78, line 67: "waythere" should read --way there--

Column 81, line 44: "(ninh=0.31)" should read --($n_{inh}$=0.31)--

Column 81, line 52: "polyarylate" should read --polyacrylate--

Column 82, line 34: "trhe" should read --the--

Column 83, line 4, Claim 4: "layers" should read --layer--

Signed and Sealed this

Eighth Day of July, 1997

*Attest:*

BRUCE LEHMAN

*Attesting Officer*   Commissioner of Patents and Trademarks